US011539514B2

(12) United States Patent
Takenoshita et al.

(10) Patent No.: US 11,539,514 B2
(45) Date of Patent: Dec. 27, 2022

(54) LOG MANAGEMENT SYSTEM, LOG MANAGEMENT APPARATUSES, METHODS AND COMPUTER PROGRAMS

(71) Applicants: UHURU CORPORATION, Tokyo (JP); ZENMUTECH, INC, Tokyo (JP)

(72) Inventors: Koyo Takenoshita, Tokyo (JP); Kiyoshi Tomomura, Tokyo (JP)

(73) Assignees: UHURU CORPORATION, Tokyo (JP); ZENMUTECH, INC, Tokyo (JP)

( * ) Notice: Subject to any disclaimer, the term of this patent is extended or adjusted under 35 U.S.C. 154(b) by 637 days.

(21) Appl. No.: 16/494,637

(22) PCT Filed: Dec. 19, 2017

(86) PCT No.: PCT/JP2017/045528
§ 371 (c)(1),
(2) Date: Sep. 16, 2019

(87) PCT Pub. No.: WO2018/168140
PCT Pub. Date: Sep. 20, 2018

(65) Prior Publication Data
US 2020/0394108 A1    Dec. 17, 2020

(30) Foreign Application Priority Data
Mar. 15, 2017   (JP) ................................ 2017-049599

(51) Int. Cl.
*H04L 9/08*  (2006.01)
*G06F 17/40* (2006.01)
*G06F 21/62* (2013.01)

(52) U.S. Cl.
CPC .............. *H04L 9/085* (2013.01); *G06F 17/40* (2013.01); *G06F 21/62* (2013.01)

(58) Field of Classification Search
CPC ......... H04L 9/085; G06F 17/40; G06F 21/62; G06F 11/34; G06F 13/00; G06F 21/60
See application file for complete search history.

(56) References Cited

U.S. PATENT DOCUMENTS 9,154,589 B1 * 10/2015 Klein .................... H04L 41/083
2010/0266120 A1 * 10/2010 Leggette ............... H04L 63/045
714/799

(Continued)

FOREIGN PATENT DOCUMENTS

| JP | 2004227352 A | * | 8/2004 |
| JP | 2007-122336 A |   | 5/2007 |
| JP | 2016177724 A | * | 10/2016 |

OTHER PUBLICATIONS

International Search Report in International Application No. PCT/JP2017/045528, dated Feb. 13, 2018, 3pp.

(Continued)

*Primary Examiner* — Henry Tsang
(74) *Attorney, Agent, or Firm* — Hauptman Ham, LLP

(57) ABSTRACT

A log management system includes a first secret splitting module to split the log data generated regularly or intermittently into a plurality of split log fragments including a split log fragment for remote transmission per predetermined unit using secret splitting scheme, the split log fragment for remote transmission having a smaller size than remaining split log fragments; a first communication control module to transmit the split log fragment for remote transmission to a remote apparatus; a second communication control module to receive, in response to occurrence of an event, one or more remaining split log fragments corresponding to the log data to be partially recovered out of the remaining split log fragments accumulated by a local apparatus; and a second secret splitting module to recover the log data from the one or more remaining split log fragments and the split log (Continued)

fragment for remote transmission using the secret splitting scheme.

12 Claims, 15 Drawing Sheets

(56) References Cited

U.S. PATENT DOCUMENTS

2014/0365655 A1* 12/2014 Takahashi ............... H04L 67/10
                                                                                   709/225
2015/0180739 A1* 6/2015 Horn ..................... G06F 11/328
                                                                                   709/224
2019/0238662 A1* 8/2019 Guibene ................. H04L 69/08

OTHER PUBLICATIONS

Written opinion in International Application No. PCT/JP2017/045528, dated Feb. 13, 2018, 9pp.

* cited by examiner

LOG MANAGEMENT SYSTEM, LOG MANAGEMENT APPARATUSES, METHODS AND COMPUTER PROGRAMS

RELATED APPLICATIONS

The present application is a National Phase of International Application Number PCT/JP2017/045528, filed Dec. 19, 2017, and claims priority to Japanese Application Number 2017-049599, filed Mar. 15, 2017.

TECHNICAL FIELD

The present disclosure relates to a log management system, log management apparatuses, methods and computer programs.

BACKGROUND ART

As a result of great advancement of information and communication technology, a wide variety of things are acquiring ability to process digital data in every field such as industry, healthcare, daily life, or the like. In the past, it has been common for industrial equipment or machinery to record log data about its operation in order to serve it for the purpose of investigation into cause when a trouble occurred, for example. There exists equipment that is used solely for logging such as monitoring cameras or drive recorders. It is expected that targets of logging will be increasingly diverse in the future as data processing ability gets more and more ubiquitous in various things. Furthermore, there are many types of log data including not only simple one such as numerical data or text data but also image data, video data, audio data, or the like.

One of disadvantages to accumulate log data is a security risk of information leakage. It is strongly demanded to prevent leakage to a third party for many types of log data such as operation logs of industrial equipment or machinery, video logs in which an individual person is likely to be visible, or medical logs.

In general, secret splitting scheme described in PTL 1 is known as a technology to provide robust security against information leakage. According to the secret splitting scheme, information is split into a plurality of fragments (also referred to as shares) such that the original information cannot be recovered unless a quorum or more fragments are put together. Even in a case where the secret splitting scheme is used, if all of the fragments are stored in one apparatus, a third party who has succeeded in an unrightful access to the apparatus might be able to easily recover the information. In order to eliminate such a risk, PTL 1 discloses a technique that a terminal transmits a fragment of data derived based on the secret splitting scheme to a remote server to cause the remote server to store it and receives the fragment from the remote server when recovering the data.

CITATION LIST

Patent Literature

[PTL 1] JP 2007-122336 A

SUMMARY

Technical Problem

However, the technique disclosed in PTL 1 is intended for protecting data viewed or utilized solely on a mobile terminal (such as personal information, customer information, or audio or video content) and is not suitable to be applied to log data. For example, ex-post analysis of log data on occurrence of a trouble is often carried out at a remote location from an origin of the log data. A data size of log data tends to become larger compared to the other types of data. Thus, if it is after all necessary to transmit entirety of the log data to a remote server, a communication delay impedes smooth operation of the system and makes it difficult to quickly analyze the log data.

Therefore, it is desirable to realize a mechanism which allows for more efficient management of log data under robust security.

Solution to Problem

According to a first aspect, there is provided a log management system for managing log data for a target, including: a local-side secret splitting module configured to split the log data that is generated regularly or intermittently for the target into a plurality of split log fragments including a split log fragment for remote transmission per predetermined unit using secret splitting scheme, the split log fragment for remote transmission having a smaller size than remaining split log fragments; a local-side communication control module configured to transmit the split log fragment for remote transmission to a remote apparatus to cause the remote apparatus to store the split log fragment for remote transmission; a remote-side communication control module configured to receive, in response to occurrence of an event that requires partial recovery of the log data, one or more remaining split log fragments corresponding to the log data to be partially recovered out of the remaining split log fragments accumulated by a local apparatus; and a remote-side secret splitting module configured to recover the log data from the one or more received remaining split log fragments and the corresponding split log fragment for remote transmission using the secret splitting scheme.

According to a second aspect, there is provided a log management apparatus for managing log data for a target, including: a local-side secret splitting module configured to split the log data that is generated regularly or intermittently for the target into a plurality of split log fragments including a split log fragment for remote transmission per predetermined unit using secret splitting scheme, the split log fragment for remote transmission having a smaller size than remaining split log fragments; and a local-side communication control module configured to transmit the split log fragment for remote transmission to a remote apparatus to cause the remote apparatus to store the split log fragment for remote transmission; wherein the local-side communication control module is further configured to transmit, in response to occurrence of an event that requires partial recovery of the log data, one or more remaining split log fragments corresponding to the log data to be partially recovered out of the remaining split log fragments accumulated by a local apparatus to a remote-side secret splitting module which is to recover the log data from the one or more remaining split log fragments and the corresponding split log fragment for remote transmission using the secret splitting scheme.

According to a third aspect, there is provided a method performed in a log management apparatus for managing log data for a target, including: splitting the log data that is generated regularly or intermittently for the target into a plurality of split log fragments including a split log fragment for remote transmission per predetermined unit using secret splitting scheme, the split log fragment for remote transmission having a smaller size than remaining split log fragments; transmitting the split log fragment for remote transmission to a remote apparatus to cause the remote apparatus to store the split log fragment for remote transmission; and transmitting, in response to occurrence of an event that requires partial recovery of the log data, one or more remaining split log fragments corresponding to the log data to be partially recovered out of the remaining split log fragments accumulated by a local apparatus to a remote-side secret splitting module which is to recover the log data from the one or more remaining split log fragments and the corresponding split log fragment for remote transmission using the secret splitting scheme.

According to a fourth aspect, there is provided a computer program stored on a computer-readable storage medium which, when executed by a processor of a log management apparatus for managing log data for a target, causes the processor to function as: a local-side secret splitting module; and a local-side communication control module; wherein the local-side secret splitting module is configured to split the log data that is generated regularly or intermittently for the target into a plurality of split log fragments including a split log fragment for remote transmission per predetermined unit using secret splitting scheme, the split log fragment for remote transmission having a smaller size than remaining split log fragments, the local-side communication control module is configured to transmit the split log fragment for remote transmission to a remote apparatus to cause the remote apparatus to store the split log fragment for remote transmission, and the local-side communication control module is further configured to transmit, in response to occurrence of an event that requires partial recovery of the log data, one or more remaining split log fragments corresponding to the log data to be partially recovered out of the remaining split log fragments accumulated by a local apparatus to a remote-side secret splitting module which is to recover the log data from the one or more remaining split log fragments and the corresponding split log fragment for remote transmission using the secret splitting scheme.

According to a fifth aspect, there is provided a log management apparatus for managing log data for a target, wherein the log data is generated regularly or intermittently for the target and is split into a plurality of split log fragments including a split log fragment for remote transmission per predetermined unit using secret splitting scheme at a local-side secret splitting module, the split log fragment for remote transmission having a smaller size than remaining split log fragments, and the log management apparatus is connected with a storage apparatus that accumulates the split log fragment for remote transmission received from the local-side secret splitting module, the log management apparatus including: a remote-side communication control module configured to receive, in response to occurrence of an event that requires partial recovery of the log data, one or more remaining split log fragments corresponding to the log data to be partially recovered out of the remaining split log fragments from a local apparatus that accumulates the remaining split log fragments; and a remote-side secret splitting module configured to recover the log data from the one or more received remaining split log fragments and the corresponding split log fragment for remote transmission using the secret splitting scheme.

According to a sixth aspect, there is provided a method performed in a log management apparatus for managing log data for a target, wherein the log data is generated regularly or intermittently for the target and is split into a plurality of split log fragments including a split log fragment for remote transmission per predetermined unit using secret splitting scheme at a local-side secret splitting module, the split log fragment for remote transmission having a smaller size than remaining split log fragments, and the split log fragment for remote transmission is accumulated by a storage apparatus that receives the split log fragment for remote transmission from the local-side secret splitting module, the method including: receiving, in response to occurrence of an event that requires partial recovery of the log data, one or more remaining split log fragments corresponding to the log data to be partially recovered out of the remaining split log fragments from a local apparatus that accumulates the remaining split log fragments; obtaining the split log fragment for remote transmission corresponding to the one or more remaining split log fragments from the storage apparatus; and recovering the log data from the one or more remaining split log fragments and the corresponding split log fragment for remote transmission using the secret splitting scheme.

According to a seventh aspect, there is provided a computer program stored on a computer-readable storage medium which, when executed by a processor of a log management apparatus for managing log data for a target, causes the processor to function as: a remote-side communication control module; and a remote-side secret splitting module; wherein the log data is generated regularly or intermittently for the target and is split into a plurality of split log fragments including a split log fragment for remote transmission per predetermined unit using secret splitting scheme at a local-side secret splitting module, the split log fragment for remote transmission having a smaller size than remaining split log fragments, the log management apparatus is connected with a storage apparatus that accumulates the split log fragment for remote transmission received from the local-side secret splitting module, the remote-side communication control module is configured to receive, in response to occurrence of an event that requires partial recovery of the log data, one or more remaining split log fragments corresponding to the log data to be partially recovered out of the remaining split log fragments from a local apparatus that accumulates the remaining split log fragments, and the remote-side secret splitting module is configured to recover the log data from the one or more received remaining split log fragments and the corresponding split log fragment for remote transmission using the secret splitting scheme.

According to an eighth aspect, there is provided a computer program product including the computer program according to the above-described fourth or seventh aspect (for example, a computer program including computer codes for causing a processor of a log management apparatus to perform the method according to the third or sixth aspect) and a computer-readable storage medium having stored thereon the computer program.

In the above-described first to eighth aspects, the log data may be split according to All Or Nothing Transform (AONT) scheme at the local side and the log data may be recovered according to the AONT scheme at the remote side. As described in detail later, utilizing the AONT scheme is suitable for mechanisms that are to maintain robust security against information leakage in an environment with constraints on available communication resources and storage resources.

In the above-described first to eighth aspects, the split log fragment for remote transmission may be regularly or intermittently transmitted from the local side to the remote side over a first communication channel and the one or more remaining split log fragments may be transmitted, in response to occurrence of the event, from the local side to the remote side over a second communication channel having a higher communication rate than the first communication channel. As described in detail later, according to such a mechanism, the communication cost as a whole required for transferring the split log fragments can be effectively reduced.

Advantageous Effects of Invention

The technology according to the present disclosure makes it possible to manage log data more efficiently under robust security.

DESCRIPTION OF EMBODIMENTS

Figure 1:
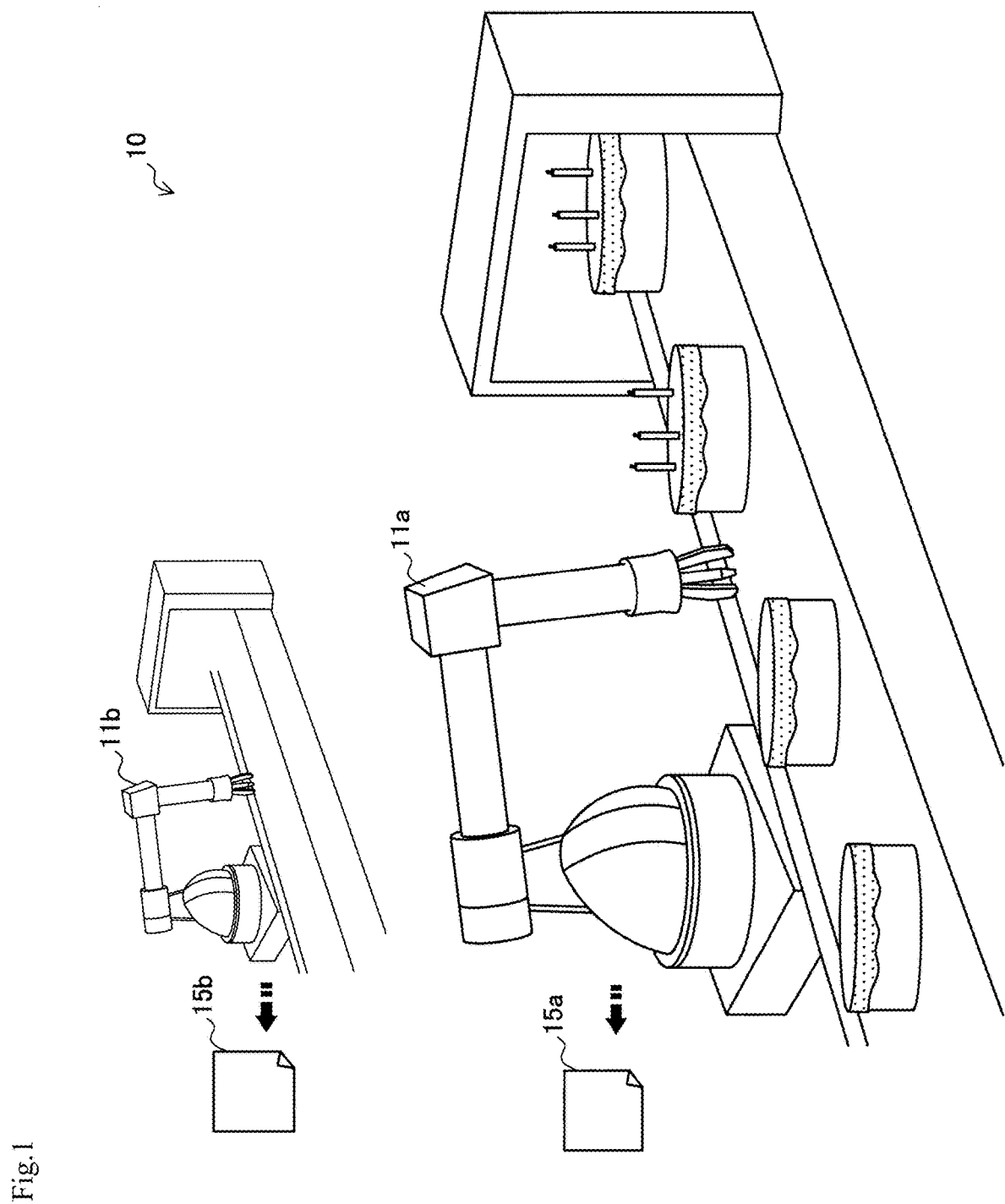
FIG. 1 is an explanatory diagram for describing a first example of log data that may be treated in some embodiments.

Hereinafter, preferred embodiments of the present disclosure will be described in detail with reference to the appended drawings. In the present Specification and the drawings, constituent elements that have substantially the same function or configuration are denoted with the same reference signs, thereby omitting duplicate explanations.

Descriptions will be given in the following order:
1. Introduction
 1-1. Various Log Data
 1-2. Description of Issues
 1-3. Basic Principle
2. First Embodiment
 2-1. Overview of System
 2-2. Configuration Example of Local-Side Log Management Apparatus
 2-3. Configuration Example of Remote-Side Log Management Apparatus
 2-4. Flows of Processes
3. Second Embodiment
4. Conclusion 1. Introduction

[1-1. Various Log Data]

FIGS. 1 to 4 illustrates examples of log data that may be treated in some embodiments of the technology according to the present disclosure. In an environment 10 illustrated in FIG. 1, one or more industrial machines 11a, 11b are placed. These industrial machines 11a, 11b are robot arms involved in a production process of products. The industrial machine 11a generates in operation or regularly an operation log 15a for its operation. When a trouble has occurred in the industrial machine 11a or it is desired to improve performance of the industrial machine 11a, the operation log 15a serves for analysis by developers. The industrial machine 11b generates in operation or regularly an operation log 15b for its operation. When a trouble has occurred in the industrial machine 11b or it is desired to improve performance of the industrial machine 11b, the operation log 15b may serve for analysis by developers.

Figure 2:
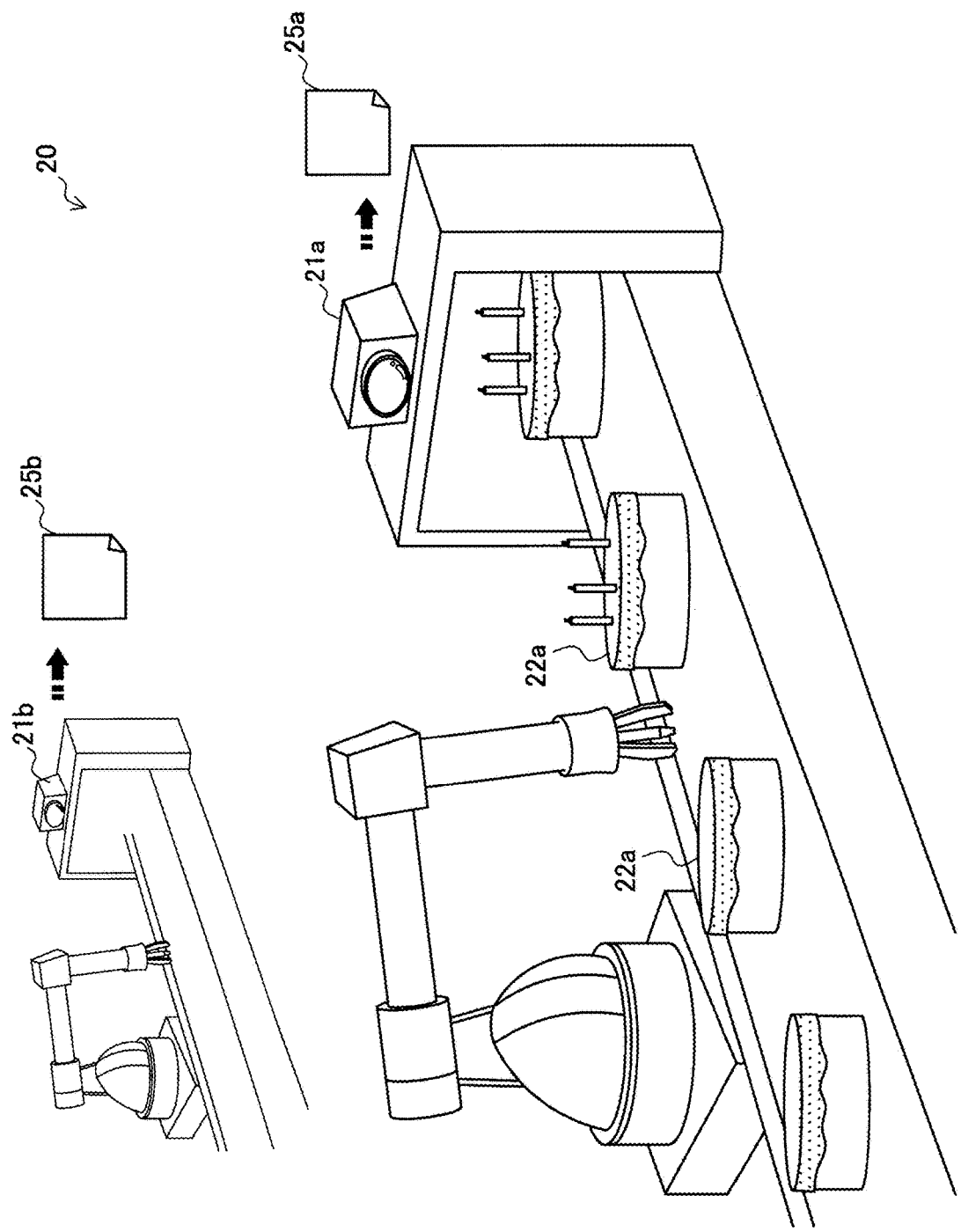
FIG. 2 is an explanatory diagram for describing a second example of log data that may be treated in some embodiments.

In an environment 20 illustrated in FIG. 2, one or more image recording apparatuses 21a, 21b are placed. These image recording apparatuses 21a, 21b are cameras that capture products produced in the environment 20. The image recording apparatus 21a sequentially captures products 22a which come into its view angle directed toward a certain production line and generates an image log 25a. The image recording apparatus 21b sequentially captures products which come into its view angle directed toward another production line and generates an image log 25b. When a trouble such as quality deterioration has arisen with the products, for example, the image log 25a or 25b may serve for investigation into cause of the trouble.

Figure 3:
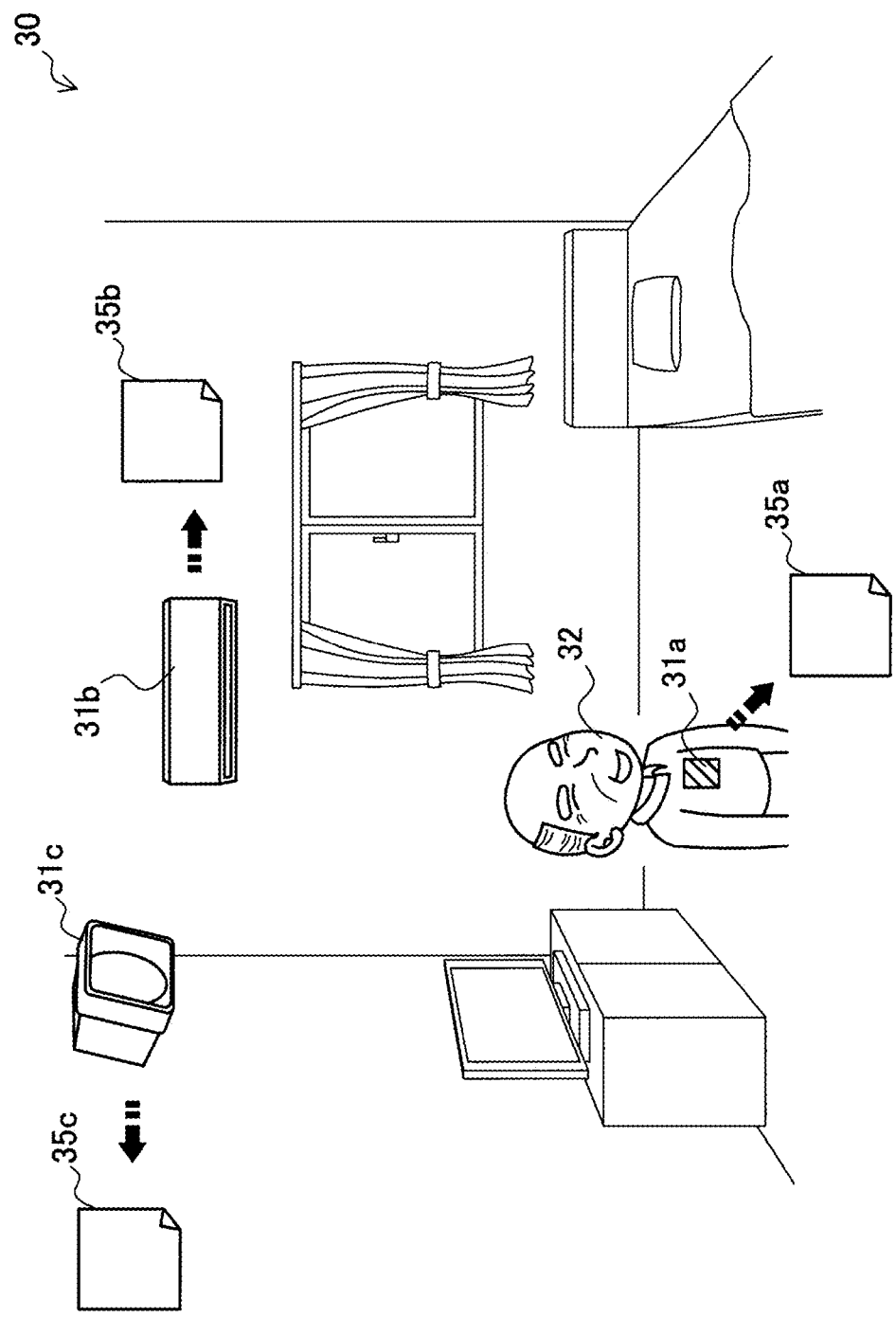
FIG. 3 is an explanatory diagram for describing a third example of log data that may be treated in some embodiments.

An environment 30 illustrated in FIG. 3 is a living space where a person 32 lives. The person 32 wears a measurement device 31a. An air conditioning device 31b and a video recording apparatus 31c are placed in the environment 30. The measurement device 31a intermittently measures body temperature, heart rate, breathing rate, and the like to generate biological information of the person 32 as a measurement log 35a. The air conditioning device 31b intermittently measures air temperature, humidity, and the like to generate environment information of the environment 30 as a measurement log 35b. The video recording apparatus 31c regularly captures the environment 30 and generates a video log 35c. When a medical problem has occurred to the person 32, for example, the measurement log 35a, the measurement log 35b, and the video log 35c may serve for investigation into cause of the medical problem by a doctor or a family member.

Figure 4:
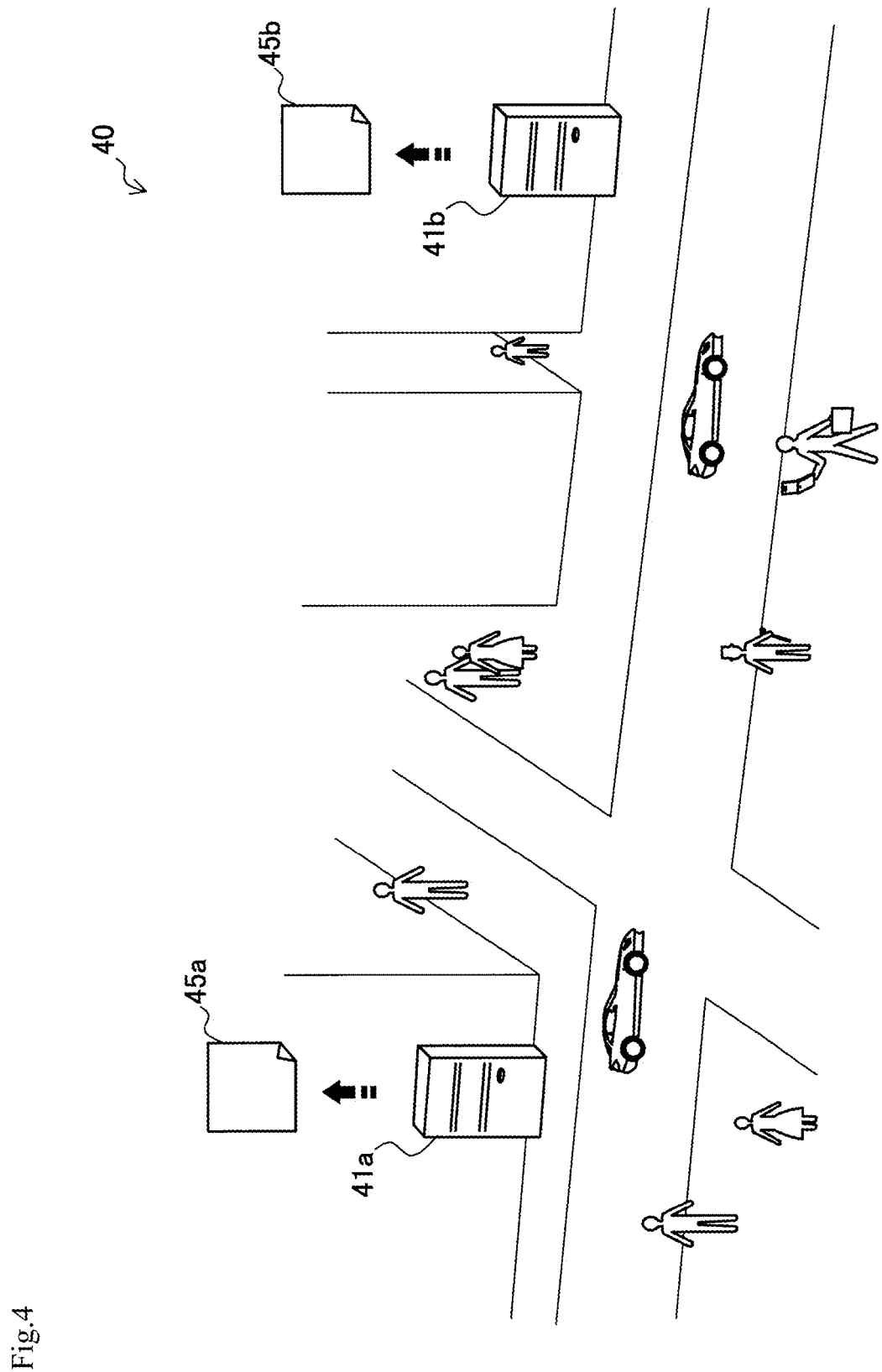
FIG. 4 is an explanatory diagram for describing a fourth example of log data that may be treated in some embodiments.

An environment 40 illustrated in FIG. 4 is an outdoor space where many people come and go. Vending machines 41a, 41b are placed in the environment 40. These vending machine 41a, 41b have respective cameras that capture spaces in front of the machines. The vending machine 41a regularly generates log data 45a in operation. The log data 45a may include, for example, measurement data about air temperature and humidity of the environment 40, operation data of the vending machine 41a, and image data captured by the camera. The vending machine 41b generates similar log data 45b. When a trouble has arisen to the vending machine 41a or the vending machine 41b such as a fault, breakage or theft, for example, the log data 45a or the log data 45b may serve for investigation into cause of the trouble.

[1-2. Description of Issues]

As described in the previous subsection, great advancement of information and communication technology results in that a wide variety of things are now equipped with ability to process digital data and it is expected in the future that not only industrial equipment or machinery but a variety of things will generate various types of log data. One of disadvantages to accumulate such log data is a security risk of information leakage. It is strongly demanded to prevent leakage to a third party for many types of log data such as operation logs of industrial equipment or machinery, video logs in which an individual person is likely to be visible, or medical logs.

In general, secret splitting scheme, which is known as a robust security technology against information leakage, splits information into a plurality of fragments such that the original information cannot be recovered unless a quorum or more fragments are put together. According to threshold splitting scheme, which is a type of the secret splitting scheme, the number of shares n can be an arbitrary integer that is equal to or larger than a quorum k, but a total data size increases up to about n times through the splitting. On the other hand, All Or Nothing Transform (AONT) scheme, which was proposed in 1997 by R. Rivest, makes it possible to transform information into a random (meaningless) bit sequence with little increase in the total data size (see "All-or-Nothing Encryption and The Package Transform" (R. Rivest, FSE '97 Proceedings of Fast Software Encryption, Pages 210-218, 1997)). AONT scheme can be utilized as a type of the secret splitting scheme in which the number of shares n is equal to the quorum k since the original information will become irrecoverable when even one bit out of the bit sequence after the transform is lost.

However, existing data management methods which make use of the secret splitting scheme have not necessarily been optimized for application to log data. In general, as log data is regularly or intermittently generated, the data size of log data is likely to become voluminous. Communication volume will be comparatively small if only one of the plurality of fragments formed using the secret splitting scheme is transmitted to an external server. However, log data is often viewed or analyzed at a remote location from an origin of the log data. In order to view or analyze the log data at such a location, the entire log data locally recovered (or the number of fragments satisfying the quorum) after all needs to be transmitted to the outside. Transmitting such a large amount of data might cause a communication delay and impede smooth operation of a system unless there is a communication channel with sufficient capacity. If the communication delay becomes larger, it will be difficult to quickly analyze the log data. Although sufficient capacity of a communication channel can be secured by employing an expensive communication service, such a solution is not viable when there are many origins of logs because it leads to a huge system operation cost.

[1-3. Basic Principle]

Herein, it is noteworthy that, in most use cases, viewing or analyzing log data is carried out when necessary for only a portion of log data that is needed. For example, in the environment 10 illustrated in FIG. 1, the industrial machines 11a, 11b regularly generate log data 15a, 15b. However, in a case of occurrence of a trouble of the industrial machine 11a, only log data 15a for the industrial machine 11a during a certain period is needed for investigation into its cause (note that sometimes log data for neighboring machines might be needed for comparison when the trouble is related to environmental temperature, for example). In the environment 30 illustrated in FIG. 3, in a case of occurrence of a trouble to the person 32, the measurement log 35a, the measurement log 35b, and the video log 35c for the past some minutes or past some hours from the time when the trouble occurred may be needed for investigation of its cause.

In light of the foregoing, the technology according to the present disclosure splits log data that is generated regularly or intermittently for a certain target into a plurality of split log fragments per predetermined unit using the secret splitting scheme and accumulates small-sized split log fragments in a remote apparatus and the remaining split log fragments in a local apparatus. Then, there is provided a mechanism that, when a partial recovery of the log data is requested, only remaining split log fragments that corresponds to a portion to be recovered are transmitted from the local side to the remote side to recover the portion of the log data. In this way, it will be possible to efficiently manage log data at a lower cost than existing techniques while keeping robust security against an unrightful access both to local and remote environments.

Figure 5:
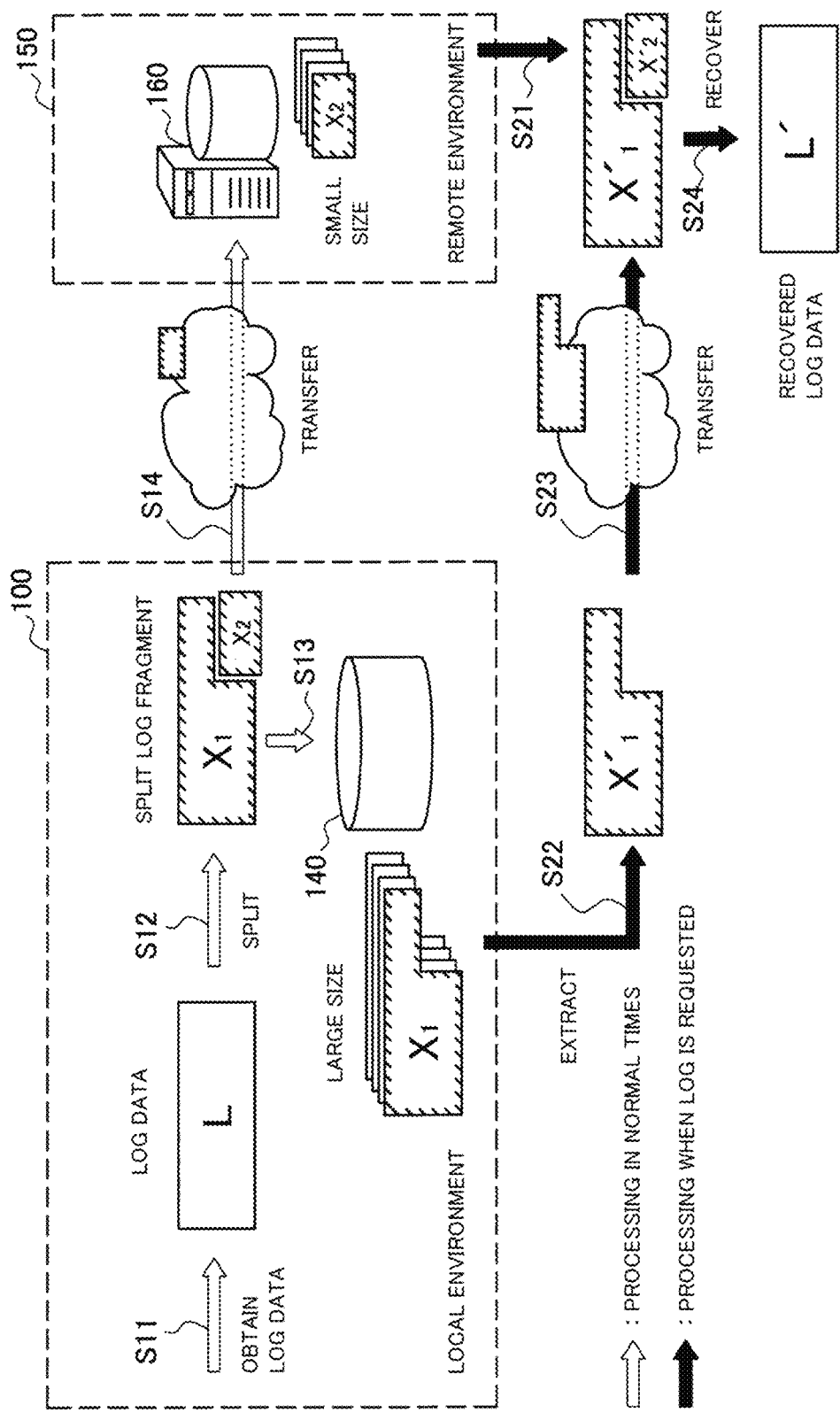
FIG. 5 is an explanatory diagram for describing a basic principle of the technology according to the present disclosure.

FIG. 5 is an explanatory diagram for describing a basic principle of the technology according to the present disclosure. In FIG. 5, hollow arrows represent processing performed in normal times when log data is accumulated whereas solid arrows represent processing performed when (partial) log data is requested. The local environment 100 is an environment where an origin (not shown) of certain log data exists. A remote environment 150 is a separate environment located remotely from the local environment 100.

In the local environment 100, in normal times, a predetermined unit of log data L is obtained from the origin of the log data (step S11). The log data L is split into a first split log fragment $X_1$ and a second split log fragment $X_2$ using the secret splitting scheme (step S12). The second split log fragment $X_2$ has a smaller size than the remaining first split log fragment $X_1$. The size of the second split log fragment $X_2$ may be at most a few bytes or up to tens of bytes, for example, though this is not a limitation. The first split log fragment $X_1$ is stored in a local storage 140 (step S13).

Meanwhile, the second split log fragment $X_2$ is transferred to the remote environment 150 (step S14) and stored in the remote storage 160. As a result of repeatedly performing such processes, the local storage 140 accumulates the first split log fragments $X_1$ for one or more targets and the remote storage 160 accumulates the second split log fragments $X_2$ for those targets.

Upon occurrence of an event that requires recovery of the log data, a second split log fragment $X'_2$ corresponding to log data to be partially recovered out of the accumulated second split log fragments $X_2$ is obtained from the remote storage 160 in the remote environment 150 (step S21). In the local environment 100, a first split log fragment $X'_1$ corresponding to the log data to be partially recovered out of the accumulated first split log fragments $X_1$ is extracted from the local storage 140 (step S22). The extracted first split log fragment $X'_1$ is transferred to the remote environment 150 (step S23). Then, the log data L' is recovered from the first split log fragment $X'_1$ and the second split log fragment $X'_2$ using the secret splitting scheme (step S24).

Note that, though FIG. 5 shows an example where one unit of log data is split into one first split log fragment and one second split log fragment, the number of split log fragments is not limited to such an example. For example, log data may be split into three or more split log fragments and any number of split log fragments except for at least one transferred to the remote environment out of those split log fragments may be stored in the local environment. Further, when recovery of log data is requested, a plurality of first split log fragments may be extracted from the local storage and transferred to the remote environment for recovery of log data for a plurality of units. Outdated split log fragments after a fixed time has elapsed from generation may be deleted in the local and remote environments. In the local environment, generation of log data, splitting using the secret splitting scheme, and accumulation of the first split log fragments may be performed in a single apparatus or may be performed respectively in multiple apparatuses (for example, interconnected by a local network). Likewise, in the remote environment, accumulation of the second split log fragments and recovery of log data using the secret splitting scheme may be performed in a single apparatus or may be performed respectively in separate apparatuses.

As understood from the above description, according to the technology of the present disclosure, only small split log fragments (hereinafter, referred to as split log fragments for remote transmission) regarding log data that is generated regularly or intermittently are transmitted to the remote side. Meanwhile, as for relatively large remaining split log fragments, only those to be actually utilized are transmitted to the remote side. Consequently, total data size of the transmitted and received split log fragments as a whole is suppressed. Depending on the size of the split log fragments for remote transmission, capacity of the communication channel that interconnects the local and remote environments in normal times may be minimal and storage capacity to be reserved in the remote environment may also be small.

Figure 6A:
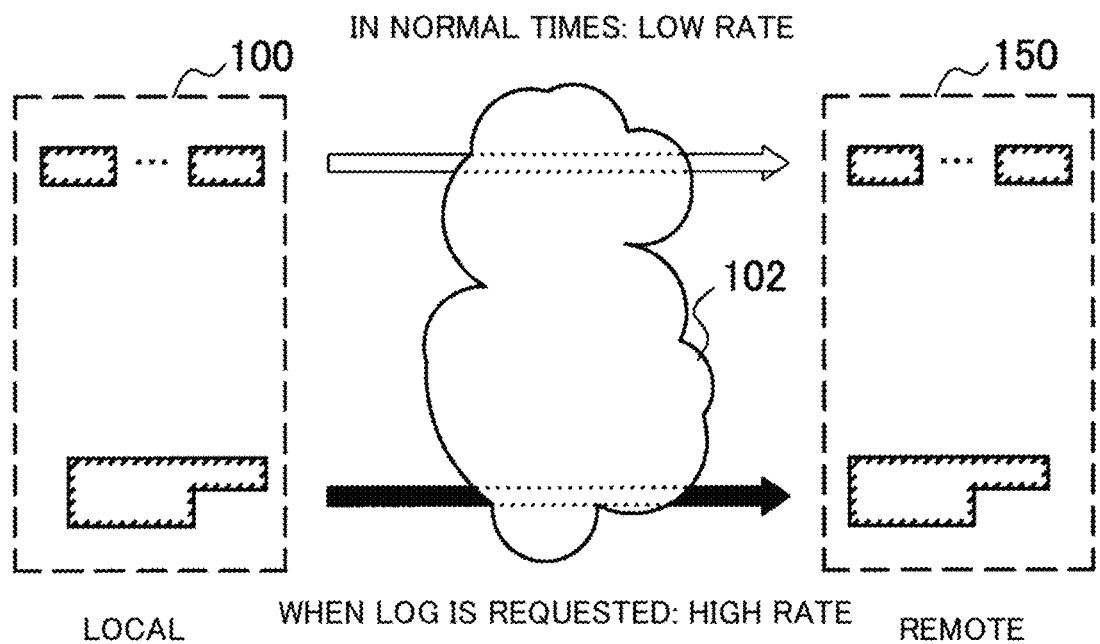
FIG. 6A is an explanatory diagram for describing an example of a communication channel that may be used for transferring split log fragments in some embodiments.
Figure 6B:
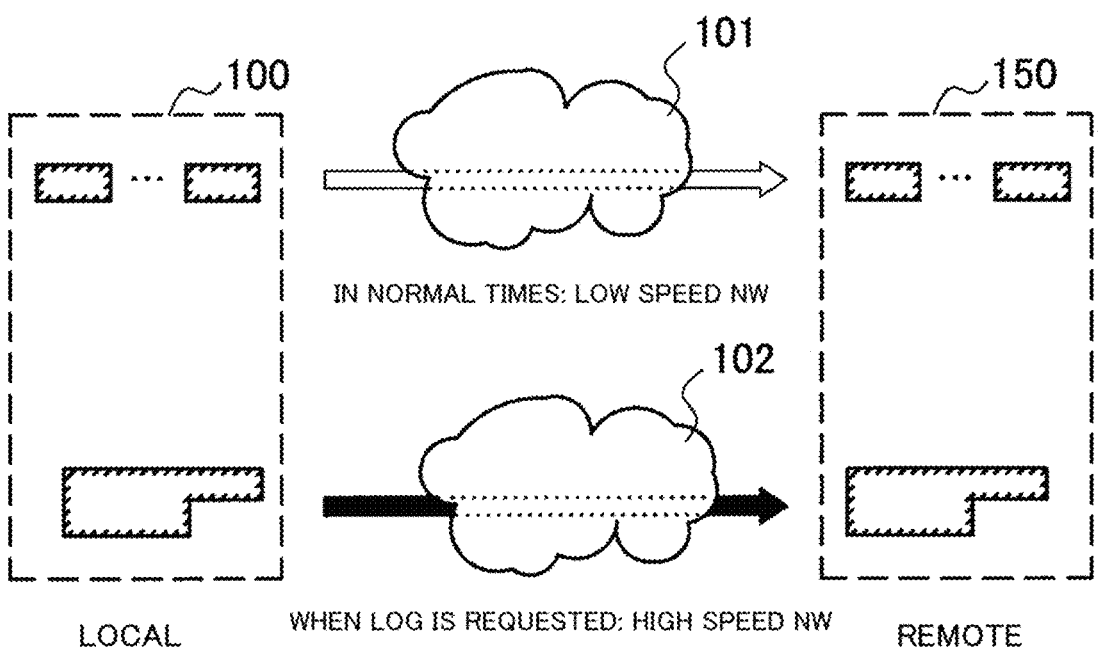
FIG. 6B is an explanatory diagram for describing another example of a communication channel that may be used for transferring split log fragments in some embodiments.

FIGS. 6A and 6B respectively illustrate examples of communication channels for use in transferring split log fragments in some embodiments. In the embodiment example of FIG. 6A, the local environment 100 and the remote environment 150 are connected to each other via a single wireless communication channel 102. The wireless communication channel 102 is a communication channel to which a communication data volume-dependent charging system or a communication rate-dependent charging system is applied. For example, the wireless communication channel 102 may be a communication channel that conforms to a cellular communication scheme such as LTE, LTE-A, GSM, UMTS, W-CDMA, CDMA2000, or WiMAX. In normal times, since only small-sized split log fragments for remote transmission are transmitted to the remote environment 150, a low communication rate is sufficient. This means that only a comparatively low communication cost will be charged for transferring the split log fragments. When a log is requested, large-sized remaining split log fragments are transmitted to the remote environment 150. In this case, it is desirable to temporarily raise the communication rate to quickly transfer the split log fragments. However, since only a portion of the accumulated remaining split log fragments is transferred, a rise in the communication cost due to temporarily raising the communication rate is suppressed.

In the embodiment example of FIG. 6B, the local environment 100 and the remote environment 150 are connected to each other via a wireless communication channel 101 and the wireless communication channel 102. For example, the wireless communication channel 101 may be a communication channel that conforms to Low Power Wide Area (LPWA) scheme. LPWA is a generic name of a wireless communication protocol which is being introduced under service names such as LoRa, Wi-Fi HaLow (IEEE 802.11ah), Wi-SUN (IEEE 802.15.4g) or NB-IoT, for example. The LPWA scheme only offers a low communication rate from tens to hundreds of bits per second while it has a communication range that reaches several kilometers to tens of kilometers and is, in general, available at an inexpensive communication cost per line. The wireless communication channel 102 is a wireless communication channel of a non-LPWA scheme and offers a higher communication rate than the wireless communication channel 101. In normal times, only small-sized split log fragments for remote transmission are transmitted to the remote environment 150 over the wireless communication channel 101. When a log is requested, the wireless communication channel 102 is activated and a large-sized remaining split log fragment is transmitted to the remote environment 150 over the wireless communication channel 102. Activation of a wireless communication channel may include, for example, turning on an electric power source of a corresponding communication interface, switching a communication interface having been held in an idle mode/sleep mode into an active mode, or establishing (or re-establishing) a connection with a network node (for example, a base station, an access point, a gateway server, or the like). In the present embodiment example, though a higher communication cost than that in normal times might be charged during a temporary period when the non-LPWA scheme is utilized, the cost as a whole required for managing log data is suppressed because only a portion of the accumulated remaining split log fragments is transferred and the non-LPWA scheme is utilized only during a short period.

Though the examples where wireless communication channels are mainly utilized have been described in connection with FIGS. 6A and 6B, a wired communication channel may be utilized as a communication channel that connects the local environment 100 with the remote environment 150. For example, the local environment 100 may be connected to the remote environment 150 with a virtual private network (VPN) scheme which overlays a private network on the Internet. In the embodiment example of FIG. 6A, a VPN channel to which a communication data volume-dependent charging system or a communication rate-dependent charging system is applied may be utilized instead of the wireless communication channel 102. Alternatively, for example, the local environment 100 may be connected to the remote environment 150 with a Fiber To The Home (FTTH) scheme or an FTTx scheme which uses an optical line. In the embodiment example of FIG. 6B, an apparatus in the local environment 100 may have subscriptions of a low communication rate and a high communication rate over an optical line and utilize the former instead of the wireless communication channel 101 and the later instead of the wireless communication channel 102.

In the present Specification, the terms of the first communication channel and the second communication channel are used to represent that there are at least two communication paths or communication means having different communication rates. Though the example where the two communication channels are provided through different communication protocols has been mainly described in connection with FIG. 6B, the two communication channels may be provided through the same communication protocol. For example, the two communication channels may be channels respectively provided by different operators or may be channels based on separate subscriptions provided by the same operator.

In some embodiment examples, the remote storage 160 may be a storage apparatus to which a storage data volume-dependent charging system is applied. According to the above-described principle, only split log fragments for remote transmission are accumulated in the remote storage 160 in normal times and only a portion of remaining split log fragments is transferred to the remote environment 150 when a log is requested. Therefore, a volume of the stored data in the remote storage 160 is also reduced. As a result, a utilization cost of a remote storage can also be suppressed.

A specific configuration of a system for realizing the mechanism described in this section will be described in more detail in the following sections.

2. First Embodiment

[2-1. Overview of System]

Figure 7:
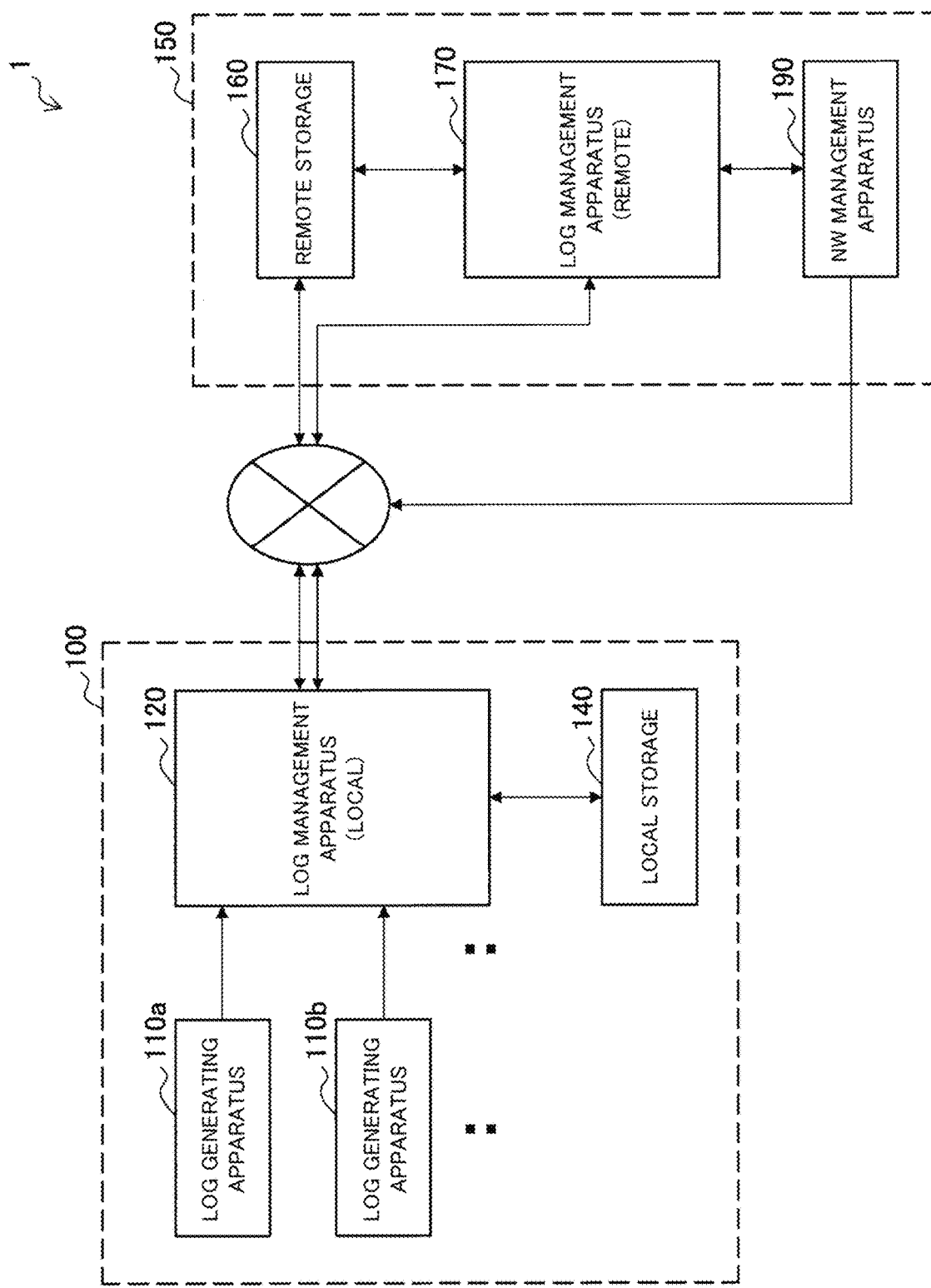
FIG. 7 is a block diagram illustrating an example of a configuration of a log management system according to a first embodiment.

FIG. 7 is a block diagram illustrating an example of a configuration of a log management system according to a first embodiment. With reference to FIG. 7, a log management system 1 includes one or more log generating apparatuses 110a, 110b, . . . , a local-side log management apparatus 120, a local storage 140, a remote storage 160, a remote-side log management apparatus 170, and a network (NW) management apparatus 190.

The log generating apparatuses 110a, 110b, . . . are located in a local environment 100 and generate log data for a target. Herein, the target is a certain object for which a record (a log) is made such as the industrial machines illustrated in FIG. 1, the products illustrated in FIG. 2, the person illustrated in FIG. 3, or the space illustrated in FIG. 4. In the present Specification, when it is not necessary to distinguish the log generating apparatuses 110a, 110b, . . . from one another, they are collectively termed log generating apparatuses 110 by omitting the trailing alphabets of reference signs. Reference signs given to other constituent elements are also treated in a similar way. The log data is data that is generated regularly or intermittently, accumulated over time, and mainly utilized afterward. The log generating apparatus 110 may be an apparatus that generates any type of log data such as the industrial machine 11 illustrated in FIG. 1, the image recording apparatus 21 illustrated in FIG. 2, the measurement device 31a, the air conditioning device 31b, or the video recording apparatus 31c illustrated in FIG. 3, or the vending machine 41 illustrated in FIG. 4. The log generating apparatus 110 outputs the generated log data to the local-side log management apparatus 120.

The local-side log management apparatus 120 is an information processing apparatus that manages accumulation and utilization of the log data for the target within the local environment 100. The local-side log management apparatus 120 splits the log data input from the log generating apparatus 110 into a plurality of split log fragments per predetermined unit using the secret splitting scheme. Then, the local-side log management apparatus 120 transmits a split log fragment for remote transmission to the remote environment 150 to cause the remote storage 160 to store it, and causes the local storage 140 to store the remaining split log fragments. An example of a detailed configuration of the local-side log management apparatus 120 will further be described later.

The local storage 140 is a storage apparatus that stores the remaining split log fragments input from the local-side log management apparatus 120. The local storage 140 has a storage medium such as a hard disk drive (HDD) or a solid state drive (SSD), for example, and accumulates the remaining split log fragments for a plurality of process units in the storage medium.

The remote storage 160 is a storage apparatus that is located in the remote environment 150 and stores the split log fragments for remote transmission received from the local-side log management apparatus 120 over the communication channel between the local environment 100 and the remote environment 150. The remote storage 160 has a storage medium such as an HDD or an SSD, for example, and accumulates the split log fragments for remote transmission for a plurality of process units in the storage medium.

The remote-side log management apparatus 170 is an information processing apparatus that manages accumulation and utilization of the log data for the target within the remote environment 150. The remote-side log management apparatus 170 receives, in response to occurrence of an event that requires partial recovery of the log data (hereinafter, referred to as a log request event), one or more remaining split log fragments corresponding to the log data to be partially recovered out of the remaining split log fragments accumulated by the local storage 140 from the local-side log management apparatus 120. The remote-side log management apparatus 170 also obtains split log fragments for remote transmission corresponding to the log data to be partially recovered from the remote storage 160. Then, the remote-side log management apparatus 170 recovers the log data from the one or more received remaining split log fragments and the corresponding split log fragments for remote transmission per predetermined unit using the secret splitting scheme. An example of a detailed configuration of the remote-side log management apparatus 170 will further be described later.

The NW management apparatus 190 is an apparatus that is arranged in the embodiment example illustrated in FIG. 6B to manage settings of the communication channels between the local environment 100 and the remote environment 150. The NW management apparatus 190 keeps the first communication channel with a relatively low communication rate activated and the second communication channel with a relatively high communication rate deactivated in normal times. In response to occurrence of a log request event, the NW management apparatus 190 temporarily activates the second communication channel (based on an instruction from a user or autonomously) and enables the remote-side log management apparatus 170 to receive one or more remaining split log fragments at the high communication rate. Note that the functionality of the NW management apparatus 190 may be integrated into the management function of the remote-side log management apparatus 170. In a case where the embodiment example illustrated in FIG. 6A is employed, the NW management apparatus 190 may be omitted from the configuration of the log management system 1.

[2-2. Configuration Example of Local-Side Log Management Apparatus]

Figure 8:
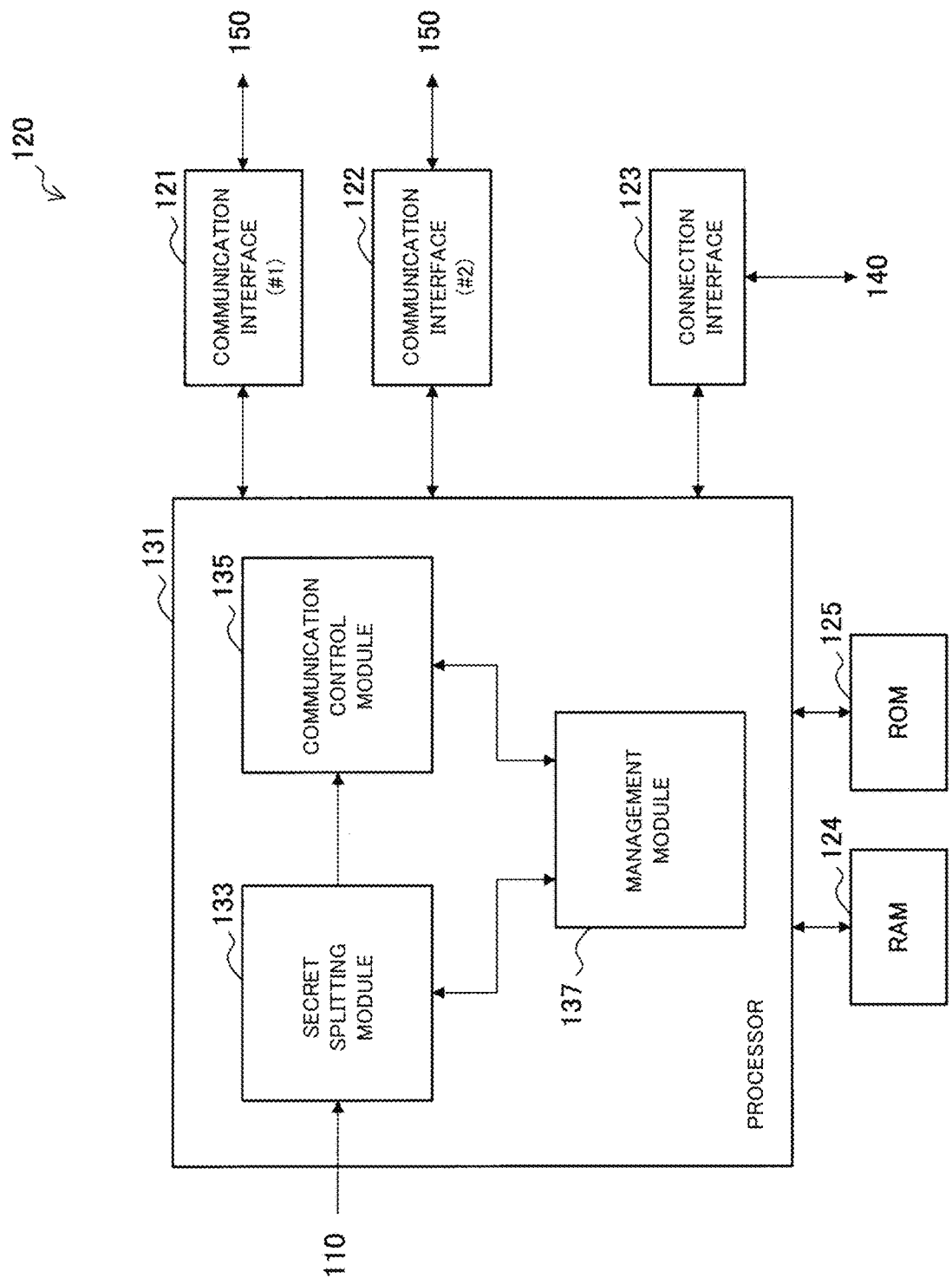
FIG. 8 is a block diagram illustrating an example of a detailed configuration of a local-side log management apparatus according to the first embodiment.

FIG. 8 is a block diagram illustrating an example of a detailed configuration of the local-side log management apparatus 120. With reference to FIG. 8, the local-side log management apparatus 120 includes a first communication interface 121, a second communication interface 122, a connection interface 123, a random access memory (RAM) 124, a read only memory (ROM) 125, and a processor 131.

(1) First Communication Interface

The first communication interface 121 is a communication interface for the local-side log management apparatus 120 to communicate with apparatuses in the remote environment 150. In the embodiment example illustrated in FIG. 6A, the first communication interface 121 may be a wireless communication interface that supports a cellular communication scheme. In the embodiment example illustrated in FIG. 6B, the first communication interface 121 may be a wireless communication interface that supports LPWA scheme. Note that the first communication interface 121 is not limited to these examples and may be a wireless communication interface that supports another type of protocol or may be a wired communication interface.

(2) Second Communication Interface

The second communication interface 122 is a further communication interface for the local-side log management apparatus 120 to communicate with apparatuses in the remote environment 150. In the embodiment example illustrated in FIG. 6A, the second communication interface 122 may be omitted from the configuration of the local-side log management apparatus 120. In the embodiment example illustrated in FIG. 6B, the second communication interface 122 may be a wireless communication interface that supports a non-LPWA scheme. Note that the second communication interface 122 is not limited to these examples and may be a wireless communication interface that supports another type of protocol or may be a wired communication interface.

(3) Connection Interface

The connection interface 123 is an interface that connects the local-side log management apparatus 120 to the local storage 140. The connection interface 123 may be any type of connection interface such as Fibre Channel, Local Area Network (LAN), Universal Serial Bus (USB), Serial Advanced Technology Attachment (SATA), or the like, for example.

(4) RAM

The RAM 124 is a volatile memory that has a role as a main memory. The RAM 124 temporarily stores computer programs and data required for operations of the local-side log management apparatus 120 when the operations are performed.

(5) ROM

The ROM 125 is a non-volatile non-transitory computer-readable memory. The ROM 125 stores computer programs that are executed by the processor 131 described below.

(6) Processor

The processor 131 may be a central processing unit (CPU) or a micro processing unit (MPU), for example. The processor 131 causes some functional modules of the local-side log management apparatus 120 to operate by executing a computer program that has been stored by the ROM 125 in advance and is loaded into the RAM 124, for example. As illustrated in FIG. 8, the functional modules of the local-side log management apparatus 120 include a secret splitting module 133, a communication control module 135, and the management module 137.

(7) Secret Splitting Module

The secret splitting module 133 splits log data for a certain target input from the log generating apparatus 110 into a plurality of split log fragments per predetermined unit using the secret splitting scheme. The plurality of split log fragments include r ($1 \le r < n$) split log fragments for remote transmission and n−r remaining split log fragments. The size of a split log fragment for remote transmission is smaller than the size of an individual remaining split log fragment or the total size of the n−r remaining split log fragments.

In the present embodiment, the secret splitting module 133 splits the log data according to AONT scheme. In this case, the number of shares n is equal to the quorum k. That is, the original log data is recoverable only if there exist all of the n−r remaining split log fragments and the r split log fragments for remote transmission. The total data size of these split log fragments is almost equal to the data size of the original log data though it may increase by the size of a short random bit sequence used for AONT transform. In the following description, it is assumed that n is equal to two and r is equal to one for ease of explanation.

In another embodiment, the secret splitting module 133 may split the log data according to threshold splitting scheme. In this case, the number of shares n is an integer that is equal to or larger than the quorum k.

In the present embodiment, the secret splitting module 133 performs the secret splitting processing per above-mentioned predetermined unit that is defined in advance so as to allow for extracting a necessary and sufficient range of the remaining split log fragments for analyzing the log data. As an example, the predetermined unit may be delimited with a fixed time interval in a time domain. For example, in a case where it is deduced that an operation log for one hour before occurrence of a trouble is needed for investigation into cause of the trouble of industrial equipment or machinery, the length of the time interval may be one hour. When there are multiple targets of logging, the predetermined unit may encompass a single target or two or more targets. For example, the secret splitting processing may be performed one time together on log data for two pieces of industrial equipment. The predetermined unit may encompass a single type of log data or two or more types of log data. For example, in the environment 30 illustrated in FIG. 3, the secret splitting processing may be performed one time together on log data output from the measurement device 31a and the air conditioning device 31b.

(8) Communication Control Module

The communication control module 135 transmits, in normal times, the split log fragments for remote transmission input from the secret splitting module 133 to the remote environment 150 to cause the remote storage 160 to store the split log fragments for remote transmission. The transmission of the split log fragments for remote transmission in normal times may be performed regularly or intermittently.

When a split log fragment transmission request is transmitted from the remote-side log management apparatus 170, the communication control module 135 may receive the request. Upon receiving the split log fragment transmission request, the communication control module 135 transmits one or more remaining split log fragments corresponding to the log data to be partially recovered that are extracted by the management module 137 from the local storage 140 to the remote-side log management apparatus 170 to cause it to partially recover the log data.

In an embodiment example, the communication control module 135 regularly or intermittently transmits the split log fragments for remote transmission to the remote environment 150 over the first communication channel via the first communication interface 121 and, when a log is requested, transmits remaining split log fragments over the first communication channel. For example, the first communication channel may be a communication channel to which a communication data volume-dependent charging system or a communication rate-dependent charging system is applied.

In another embodiment example, the communication control module 135 regularly or intermittently transmits the split log fragments for remote transmission to the remote environment 150 over the first communication channel via the first communication interface 121 and, when a log is requested, transmits remaining split log fragments over the second communication channel having a higher communication rate than the first communication channel via the second communication interface 122. For example, the first communication channel may be a wireless communication channel of the LPWA scheme and the second communication channel may be a wireless communication channel of the non-LPWA scheme. The communication control module 135 may keep the second communication interface 122 deactivated in normal times and temporarily activate the second communication interface 122 when a log is requested.

(9) Management Module

The management module 137 manages the secret splitting processing performed by the secret splitting module 133 and the split log fragments transmission by the communication control module 135. For example, when log data that satisfies the predetermined unit has been input from the log generating apparatus 110, the management module 137 causes the secret splitting module 133 to perform the secret splitting processing on the log data. Then, the management module 137 causes the communication control module 135 to transmit a split log fragment for remote transmission to the remote environment 150 and causes the local storage 140 to store the remaining split log fragments via the connection interface 123. The management module 137 repeatedly performs this processing and, as a result, the remaining split log fragments for a plurality of units are accumulated in the local storage 140 while the split log fragments for remote transmission for the plurality of units are accumulated in the remote storage 160. The split log fragments for remote transmission that have been successfully delivered to the remote environment 150 are erased from the memory of the local-side log management apparatus 120.

The management module 137 monitors occurrence of a log request event. Typically, the occurrence of a log request event is recognized through reception of a split log fragment transmission request from the remote-side log management apparatus 170. Upon receiving the split log fragment transmission request, the management module 137 extracts, from the local storage 140, one or more remaining split log fragments in a range designated by the request and causes the communication control module 135 to transmit the one or more extracted remaining split log fragments to the remote-side log management apparatus 170.

Additionally or alternatively, the management module 137 may also detect occurrence of a log request event autonomously. As an example, the management module 137 may detect some trouble for a target based on the log data input from the log generating apparatus 110. For example, an unusual appearance of the target that appears in an image log or a video log, or an abnormal measurement value present in a measurement log may be a condition for detecting a certain trouble for the target. As another example, the management module 137 may detect some trouble for a target by monitoring operational status of the target. Upon autonomously detecting such a log request event, the management module 137 may cause the communication control module 135 to transmit remaining split log fragments corresponding to one or more time intervals in the past to the remote-side log management apparatus 170. Occurrence of a log request event may also be recognized based on an instruction from a user in the local environment 100.

[2-3. Configuration Example of Remote-Side Log Management Apparatus]

Figure 9:
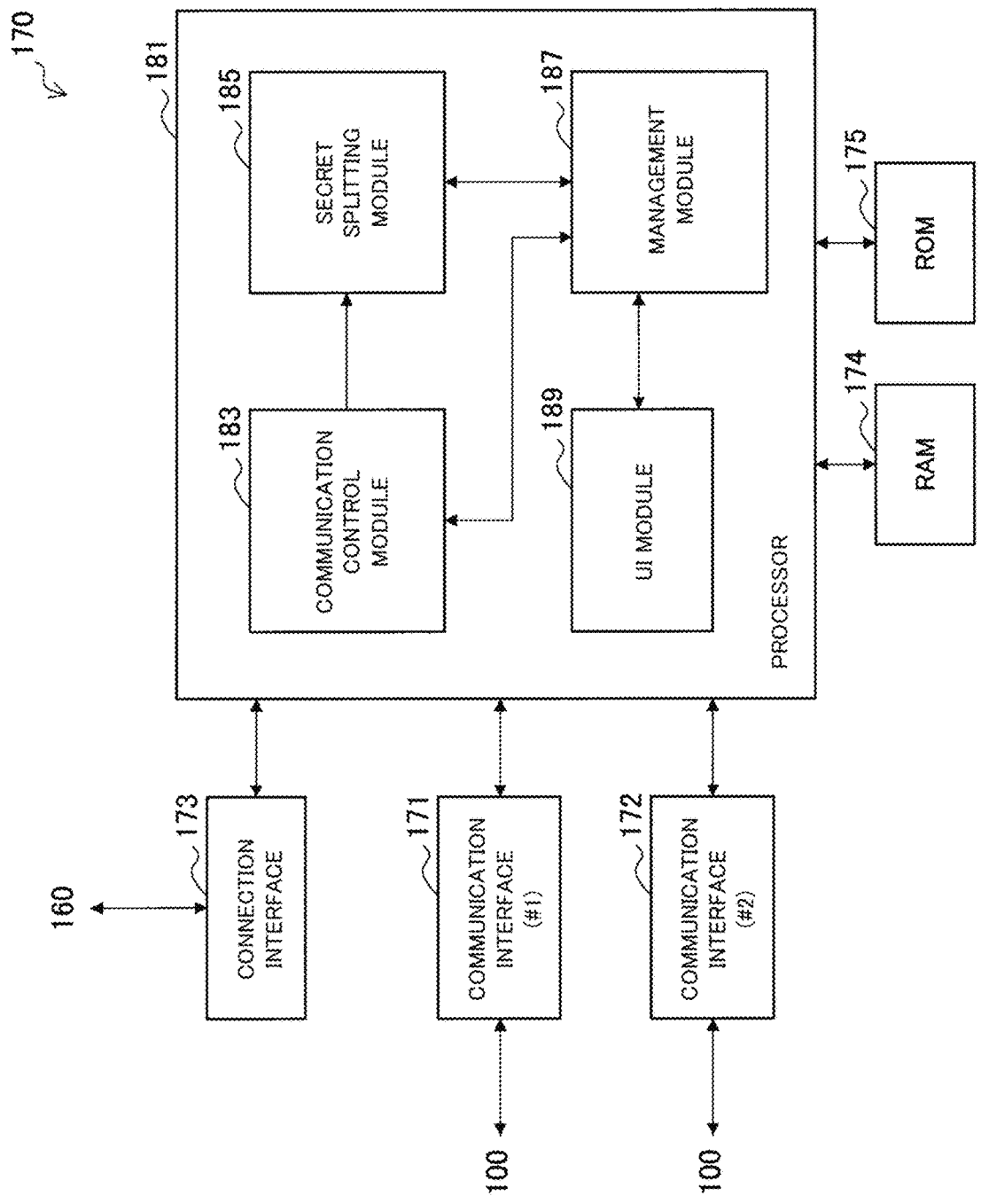
FIG. 9 is a block diagram illustrating an example of a detailed configuration of a remote-side log management apparatus according to the first embodiment.

FIG. 9 is a block diagram illustrating an example of a detailed configuration of the remote-side log management apparatus 170. With reference to FIG. 9, the remote-side log management apparatus 170 includes a first communication interface 171, a second communication interface 172, a connection interface 173, a RAM 174, a ROM 175, and a processor 181.

(1) First Communication Interface

The first communication interface 171 is a communication interface for the remote-side log management apparatus 170 to communicate with other apparatuses. In the embodiment example illustrated in FIG. 6A, the first communication interface 171 may be a wireless communication interface that supports a cellular communication scheme. In the embodiment example illustrated in FIG. 6B, the first communication interface 171 may be a wireless communication interface that supports LPWA scheme. Note that the first communication interface 171 is not limited to these examples and may be a wireless communication interface that supports another type of protocol or may be a wired communication interface.

(2) Second Communication Interface

The second communication interface 172 is a further communication interface for the remote-side log management apparatus 170 to communicate with other apparatuses. In the embodiment example illustrated in FIG. 6A, the second communication interface 172 may be omitted from the configuration of the remote-side log management apparatus 170. In the embodiment example illustrated in FIG. 6B, the second communication interface 172 may be a wireless communication interface that supports a non-LPWA scheme. Note that the second communication interface 172 is not limited to these examples and may be a wireless communication interface that supports another type of protocol or may be a wired communication interface.

(3) Connection Interface

The connection interface 173 is an interface that connects the remote-side log management apparatus 170 to the remote storage 160. The connection interface 173 may be any type of interface such as Fibre Channel, LAN, USB, SATA, or the like, for example.

(4) RAM

The RAM 174 is a volatile memory that has a role as a main memory. The RAM 174 temporarily stores computer programs and data required for operations of the remote-side log management apparatus 170 when the operations are performed.

(5) ROM

The ROM 175 is a non-volatile non-transitory computer-readable memory. The ROM 175 stores computer programs that are executed by the processor 181 described below.

(6) Processor

The processor 181 may be a CPU or an MPU, for example. The processor 181 causes some functional modules of the remote-side log management apparatus 170 to operate by executing a computer program that has been stored by the ROM 175 in advance and is loaded into the RAM 174, for example. As illustrated in FIG. 9, the functional modules of the remote-side log management apparatus 170 include a communication control module 183, a secret splitting module 185, a management module 187, and a user interface (UI) module 189.

(7) Communication Control Module

In the present embodiment, the communication control module 183 receives, in normal times, the split log fragments for remote transmission from the local-side log management apparatus 120 to cause the remote storage 160 to store the split log fragments for remote transmission. The reception of the split log fragments for remote transmission may be performed regularly or intermittently. In another embodiment, the split log fragments for remote transmission transmitted from the local-side log management apparatus 120 may be received by the remote storage 160 without passing through the remote-side log management apparatus 170.

In response to occurrence of a log request event, the communication control module 183 transmits a split log fragment transmission request designating one or more remaining split log fragments corresponding to the log data to be partially recovered to the local-side log management apparatus 120. Then, the communication control module 183 receives the one or more remaining split log fragments which have been designated by the request and is transmitted from the local-side log management apparatus 120 as a response to the split log fragment transmission request. The communication control module 183 outputs the one or more received remaining split log fragments to the secret splitting module 185.

In an embodiment example, the communication control module 183 regularly or intermittently receives the split log fragments for remote transmission over the first communication channel via the first communication interface 171 and, when a log is requested, receives remaining split log fragments over the first communication channel. For example, the first communication channel may be a communication channel to which a communication data volume-dependent charging system or a communication rate-dependent charging system is applied.

In another embodiment example, the communication control module 183 regularly or intermittently receives the split log fragments for remote transmission over the first communication channel via the first communication interface 171 and, when a log is requested, receives remaining split log fragments over the second communication channel having a higher communication rate than the first communication channel via the second communication interface 172. For example, the first communication channel may be a wireless communication channel of the LPWA scheme and the second communication channel may be a wireless communication channel of the non-LPWA scheme. The communication control module 183 may keep the second communication interface 172 deactivated in normal times and temporarily activate the second communication interface 172 when a log is requested.

In response to occurrence of a log request event, the communication control module 183 obtains one or more split log fragments for remote transmission corresponding to the log data to be partially recovered from the remote storage 160. The communication control module 183 outputs the one or more obtained split log fragments for remote transmission to the secret splitting module 185 in association with the above-described one or more remaining split log fragments.

(8) Secret Splitting Module

The secret splitting module 185 partially recovers the log data from the one or more remaining split log fragments input from the communication control module 183 and the corresponding split log fragment for remote transmission using the secret splitting scheme.

In the present embodiment, the secret splitting module 185 recovers one unit of log data from n split log fragments (n is the number of shares) in total consisting of a split log fragment for remote transmission and remaining split log fragments according to AONT scheme. In another embodiment, the secret splitting module 185 may recover the log data according to threshold splitting scheme. In this case, the secret splitting module 185 may recover one unit of log data from k split log fragments (k is the quorum) in total consisting of a split log fragment for remote transmission and remaining split log fragments.

The secret splitting module 185 outputs the recovered log data to the management module 187.

(9) Management Module

The management module 187 manages collecting the split log fragments by the communication control module 183 and the secret splitting processing by the secret splitting module 185.

For example, the management module 187 retains management information (not shown) that indicates in what unit the split log fragments for remote transmission are accumulated in the remote storage 160. Then, the management module 187 monitors occurrence of a log request event. For example, the management module 187 may recognize occurrence of a log request event based on an instruction from a user input via the UI module 189. Typically, the instruction from a user includes designation of target and time interval of log data the user wants to recover. The instruction from a user may further include designation of type of log data the user wants to recover. Additionally or alternatively, the management module 187 may recognize occurrence of a log request event automatically. For example, the management module 137 may detect a trouble of a target at a specific time point by remotely monitoring operational status of the target and recognize occurrence of a log request event.

In response to occurrence of a log request event, the management module 187 creates a split log fragment transmission request that designates one or more remaining split log fragments corresponding to the log data to be partially recovered and causes the communication control module 183 to transmit the created request to the local-side log management apparatus 120. The management module 187 causes the communication control module 183 to receive the one or more remaining split log fragments that are transmitted from the local-side log management apparatus 120 as a response to the request. As described above in connection with the NW management apparatus 190, the management module 187 may temporarily activates the second communication channel in the case of receiving one or more remaining split log fragments and causes the remaining split log fragments to be received over the activated second communication channel.

The management module 187 causes the communication control module 183 to obtain one or more split log fragments for remote transmission corresponding to the log data to be partially recovered from the remote storage 160. Then, the management module 187 causes the secret splitting module 185 to recover the log data from the one or more remaining split log fragments received by the communication control module 183 and the corresponding split log fragments for remote transmission using the secret splitting scheme. The management module 187 provides the user with the log data recovered by the secret splitting module 185 via the UI module 189.

(10) UI Module

The UI module 189 provides a user interface for the remote-side log management apparatus 170 to present information to a user and to receive an instruction or information input from a user. In a case where a user accesses the remote-side log management apparatus 170 from a separate terminal apparatus, the UI module 189 provides the terminal apparatus with a graphical user interface (GUI) or a command line interface (CUI), for example. In a case where a user directly operates the remote-side log management apparatus 170, such UIs may be displayed on a screen of a display (not shown) of the remote-side log management apparatus 170. Such UIs allow a user to designate, for example, a target, a time interval, and a type of log data to be recovered depending on a predefined logical unit of the secret splitting processing. Once the designated log data is recovered, the UI module 189 may cause the recovered log data to be displayed on a screen or let the user download the log data file.

Figure 10A:
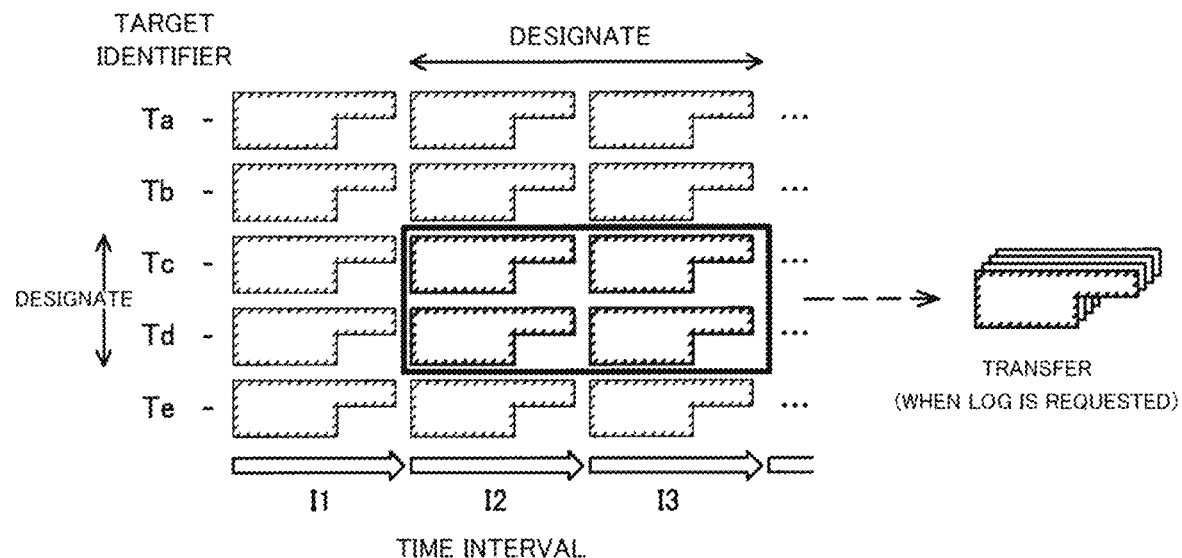
FIG. 10A is an explanatory diagram for describing a first example of a range of split log fragments to be transferred upon occurrence of a log request event.
Figure 10B:
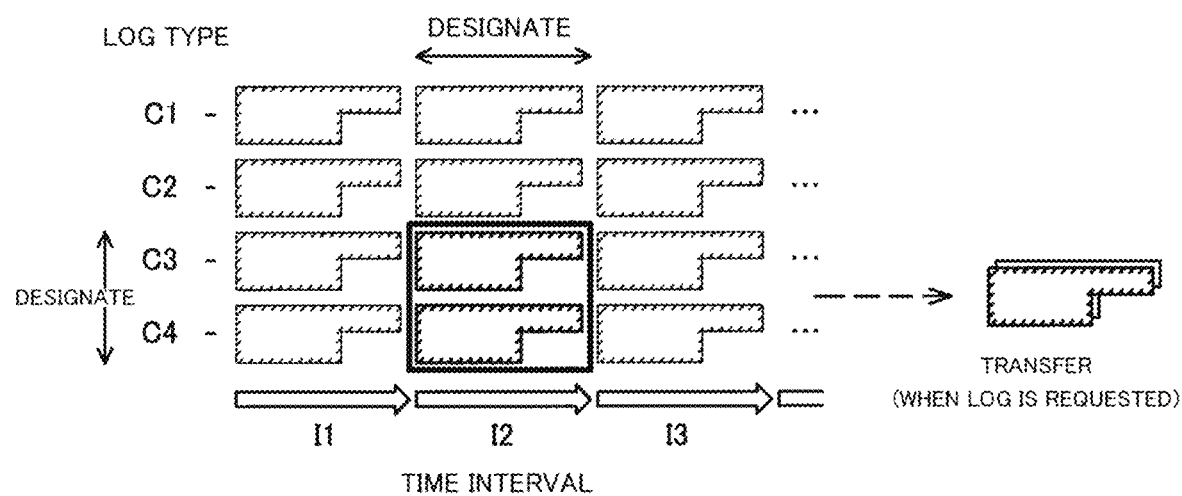
FIG. 10B is an explanatory diagram for describing a second example of a range of split log fragments to be transferred upon occurrence of a log request event.

FIGS. 10A and 10B illustrate examples of a range of split log fragments to be transferred upon occurrence of a log request event. In the example of FIG. 10A, the log data is split per unit of one target and one time interval of the log. Targets of the log are respectively identified by the target identifiers Ta, Tb, Tc, Td, and Te. Time intervals are sequentially given the labels of Ii (i=1, 2, 3, . . . ) for the sake of expedience. The local storage 140 has accumulated the remaining split log fragments corresponding to the log data of at least time intervals T1, T2, and T3 for each of the five targets Ta, Tb, Tc, Td, and Te. Herein, assume that a user finds that a trouble occurred in the target Tc at a time point included in the time interval I3. The user wants to recover, for example, log data of the time intervals I2 and I3 about the target Tc for investigation into cause of the trouble, and log data of the time intervals I2 and I3 about the target Td (located adjacent to the target Tc, for example) for comparison. Hence, the user designates a range corresponding to such log data to instruct the remote-side log management apparatus 170 to recover the log data. The remote-side log management apparatus 170 generates a split log fragment transmission request in accordance with the instruction from the user and transmits the generated split log fragment transmission request to the local-side log management apparatus 120. The local-side log management apparatus 120 extracts the four remaining split log fragments within the range designated by the split log fragment transmission request from the local storage 140 and transmits the extracted remaining split log fragments to the remote-side log management apparatus 170.

In the example of FIG. 10B, the log data is split per unit of one type and one time interval of the log. Types of the log are respectively identified by the type identifiers C1, C2, C3, and C4. The local storage 140 has accumulated the remaining split log fragments corresponding to the log data of at least time intervals T1, T2, and T3 for each of the four types. Herein, assume that occurrence of a trouble of a target related to the log types C3 and C4 at a time point included in the time interval I2 is detected. The remote-side log management apparatus 170 generates a split log fragment transmission request that designates the time interval I2 and the log types C3 and C4, and transmits the generated split log fragment transmission request to the local-side log management apparatus 120. The local-side log management apparatus 120 extracts the two remaining split log fragments within the range designated by the split log fragment transmission request from the local storage 140 and transmits the extracted remaining split log fragments to the remote-side log management apparatus 170.

It should be noted that the "predetermined unit" of the secret splitting processing described above means a logical unit for managing log data. From an implementation perspective, for example, splitting (or recovering) log data according to AONT scheme may be embodied as iterative AONT transform (or inverse AONT transform) for each block of log data segmented by a fixed size. As an example, when a size of a logical unit of log data is 8192 bytes (including a random bit sequence), the log data is segmented into two blocks each of which has a size of 4096 bytes, and each block is split into a split log fragment for remote transmission of 4 bytes and a remaining split log fragment of 4092 bytes. As a result, the size of one logical unit of the split log fragments for remote transmission will be 4 bytes multiplied by 2 resulting in 8 bytes and the size of remaining split log fragments will be 4092 bytes multiplied by 2 resulting in 8184 bytes. The compression ratio of log data in this case is about 1000 to 1, which means that both required communication data volume and storage data volume can be reduced to one thousandth compared to the case where the entire log data is transmitted to a remote storage.

[2-4. Flows of Processes]

(1) Processes at Local Side

Figure 11:
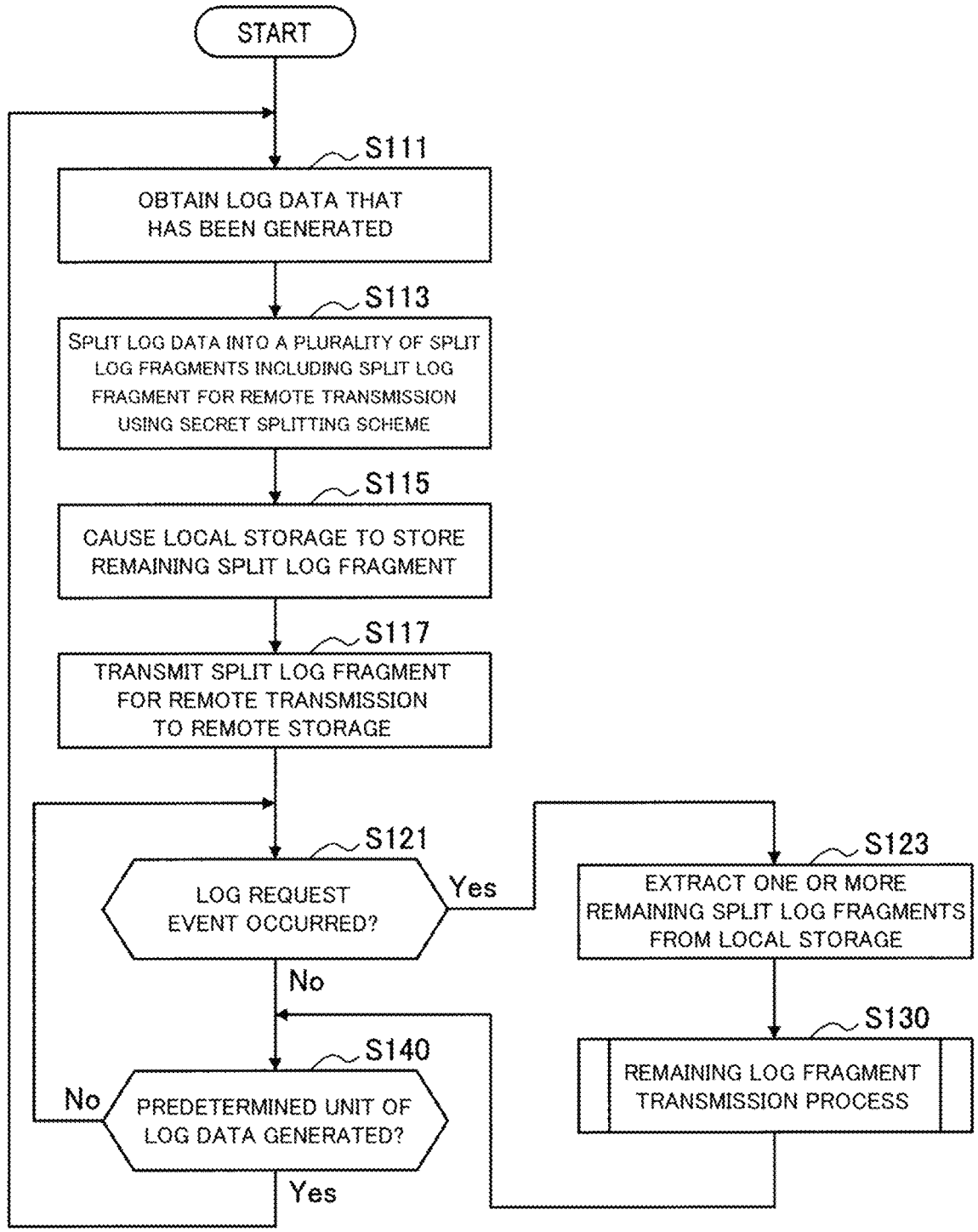
FIG. 11 is a flow chart illustrating an example of a flow of a process performed by the local-side log management apparatus according to the first embodiment.

FIG. 11 is a flow chart illustrating an example of a flow of a process performed by the local-side log management apparatus 120 according to the present embodiment.

First, the secret splitting module 133 obtains a unit of log data that has been generated at the log generating apparatus 110 (step S111).

Next, the secret splitting module 133 splits the obtained log data into a plurality of split log fragments including a split log fragment for remote transmission and a remaining split log fragment using secret splitting scheme (step S113).

Next, the management module 137 causes the local storage 140 to store the remaining split log fragment via the connection interface 123 (step S115).

Next, the communication control module 135 causes the split log fragment for remote transmission to be transmitted to the remote storage 160 (step S117). The transmission of the split log fragment for remote transmission herein may be performed over a communication channel with a relatively low communication rate, or may be performed over a communication channel to which a communication data volume-dependent charging system or a communication rate-dependent charging system is applied, for example.

During these process steps being performed, the management module 137 monitors occurrence of a log request event (for example, reception of a split log fragment transmission request from the remote side) (step S121). The management module 137 also determines whether a predetermined unit of log data has been newly generated (step S140).

If no log request event has occurred and the predetermined unit of log data has been newly generated (for example, a predefined time interval has elapsed), the process goes back to step S111, and splitting for a next unit of log data, storing a remaining split log fragment, and transmitting a split log fragment for remote transmission are repeated. Through such repetitions, remaining split log fragments are accumulated in the local storage 140 and split log fragments for remote transmission are accumulated in the remote storage 160.

At step S121, if it is determined that a log request event has occurred, the management module 137 extracts one or more remaining split log fragments corresponding to log data to be partially recovered out of the remaining split log fragments accumulated in the local storage 140 (step S123). For example, when a split log fragment transmission request is received, the request designates which range of the remaining split log fragments should be extracted.

Then, the management module 137 causes the communication control module 135 to transmit the one or more remaining split log fragments extracted from the local storage 140 to the remote side by performing a remaining log fragment transmission process that will further be described later (step S130).

(2) Remaining Log Fragment Transmission (Reception) Process—First Example

Figure 12A:
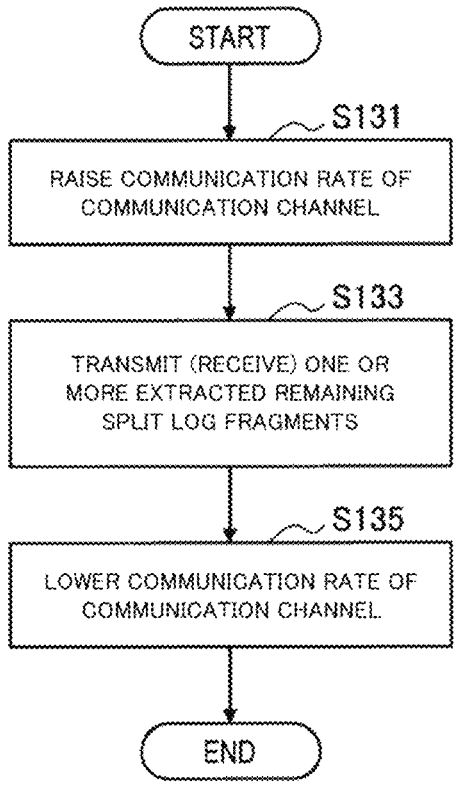
FIG. 12A is a flow chart illustrating a first example of a detailed flow of a remaining log fragment transmission (reception) process.

FIG. 12A is a flow chart illustrating a first example of a detailed flow of the remaining log fragment transmission process that may be performed at step S130 of FIG. 11.

First, the management module 137 raises the communication rate of the communication channel between the local environment 100 and the remote environment 150 (step S131).

Next, the communication control module 135 transmits the one or more remaining split log fragments extracted from the local storage 140 to the remote side over the communication channel of which communication rate has been raised (step S133).

Next, the management module 137 lowers the communication rate of the communication channel between the local environment 100 and the remote environment 150 to put it back (step S135).

(3) Remaining Log Fragment Transmission (Reception) Process—Second Example

Figure 12B:
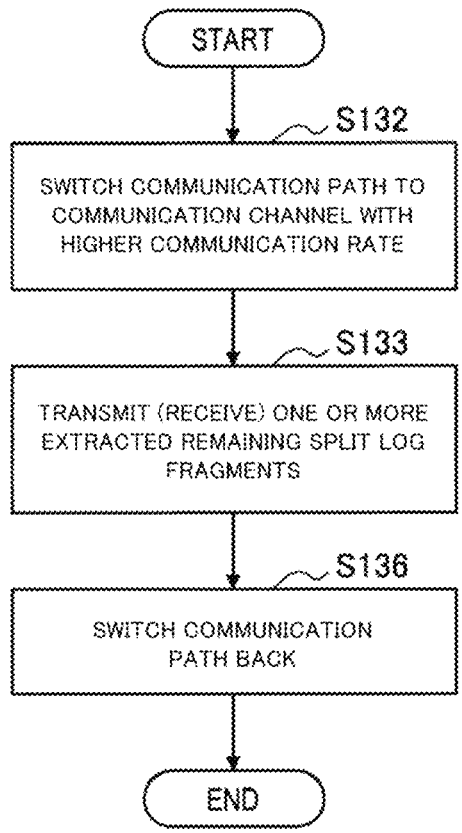
FIG. 12B is a flow chart illustrating a second example of a detailed flow of the remaining log fragment transmission (reception) process.

FIG. 12B is a flow chart illustrating a second example of a detailed flow of the remaining log fragment transmission process that may be performed at step S130 of FIG. 11.

First, the management module 137 switches the communication path between the local environment 100 and the remote environment 150 from a communication channel with a relatively low communication rate to a communication channel with a relatively high communication rate (step S132). The communication channel may be switched, for example, through activation and deactivation of the communication channels or by switching a subscription setting to be used.

Next, the communication control module 135 transmits the one or more remaining split log fragments extracted from the local storage 140 to the remote side over the communication channel with a relatively high communication rate (step S133).

Next, the management module 137 switches the communication path between the local environment 100 and the remote environment 150 back from the communication channel with the relatively high communication rate to the communication channel with the relatively low communication rate (step S136).

Note that the remaining log fragment reception process at step S180 of FIG. 13 described next may be performed in a similar way to the flow illustrated in FIG. 12A or 12B, except that the remaining split log fragment is not transmitted but received.

(4) Processes at Remote Side

Figure 13:
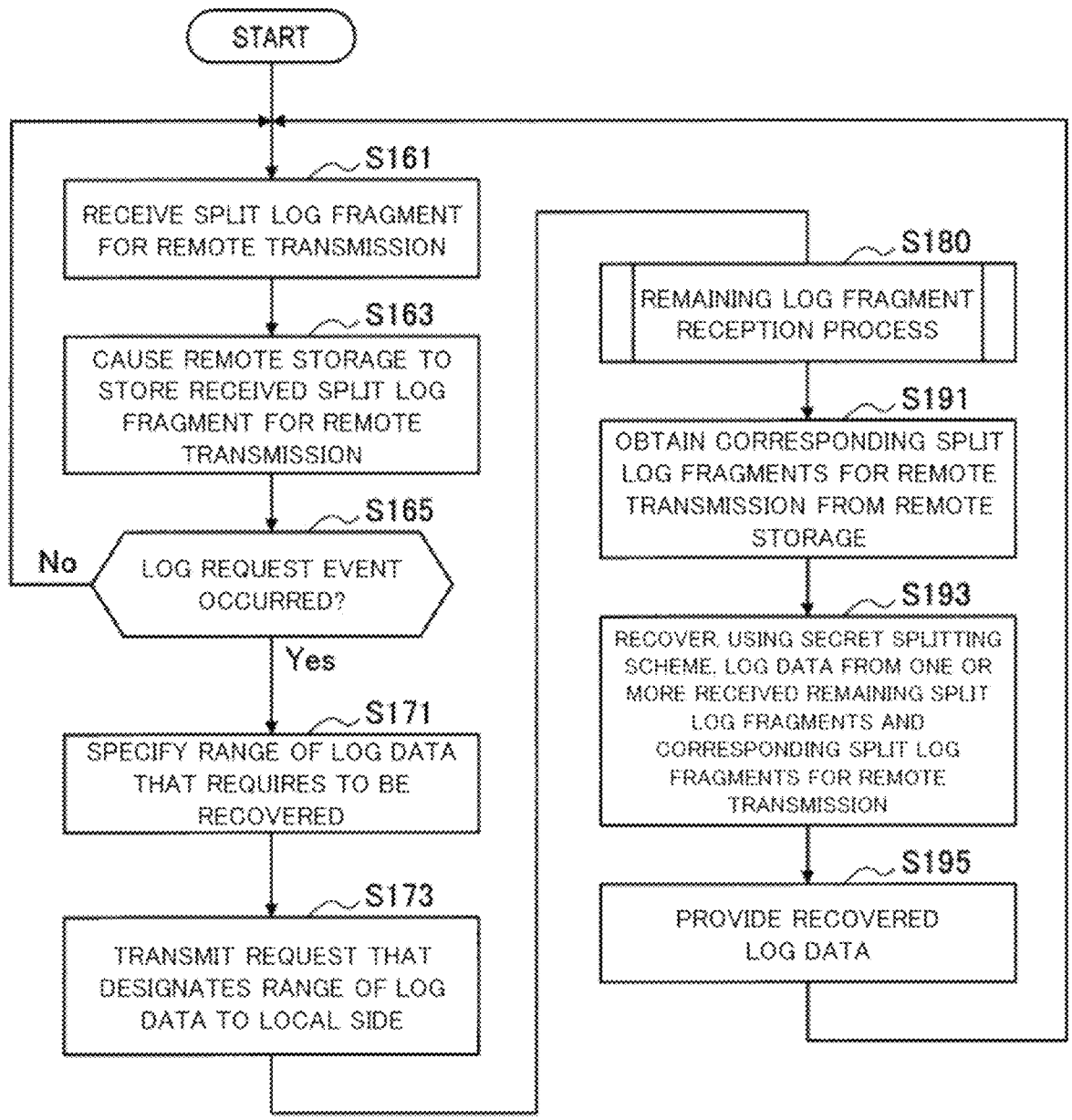
FIG. 13 is a flow chart illustrating an example of a flow of a process performed by the remote-side log management apparatus according to the first embodiment.

FIG. 13 is a flow chart illustrating an example of a flow of a process performed by the remote-side log management apparatus 170 according to the present embodiment.

First, the communication control module 183 receives a split log fragment for remote transmission from the local-side log management apparatus 120 (step S161). The reception of the split log fragment for remote transmission herein may be performed over a communication channel with a relatively low communication rate, or may be performed over a communication channel to which a communication data volume-dependent charging system or a communication rate-dependent charging system is applied, for example.

Next, the communication control module 183 causes the remote storage 160 to store the received split log fragment for remote transmission (step S163).

The management module 187 monitors occurrence of a log request event (step S165). If no log request event has occurred, the process goes back to step S161 and a next split log fragment for remote transmission is received. Through such repetitions, split log fragments for remote transmission are accumulated in the remote storage 160.

At step S165, if it is determined that a log request event has occurred, the management module 187 specifies a range of log data that requires to be recovered (step S171). The range of log data may be designated by a user instruction received via a user interface or may be automatically determined.

Next, the communication control module 183 transmits a split log fragment transmission request that designates the range of log data to be partially recovered to the local-side log management apparatus 120 (step S173).

Next, the communication control module 183 receives one or more remaining split log fragments extracted from the local storage 140 in the local environment 100 by performing the remaining log fragment reception process (step S180). An example of a detailed flow of the remaining log fragment reception process performed herein is, as mentioned above, illustrated in FIG. 12A or 12B.

The communication control module 183 also obtains, from the remote storage 160, split log fragments for remote transmission that correspond to the log data to be partially recovered (correspond to the one or more remaining split log fragments received at step S180) (step S191).

Next, the secret splitting module 185 recovers, using the secret splitting scheme, the log data from the one or more remaining split log fragments and the corresponding split log fragments for remote transmission that have been collected through step S180 and step S191 (step S193).

Next, the management module 187 provides a user with the log data recovered by the secret splitting module 185 via the UI module 189 (step S195).

In any process described above using a flow chart, the process steps may not necessarily be performed in the order shown in the chart. Some process steps may be performed in parallel. Moreover, an additional process step may be adopted and some process steps may be omitted.

3. Second Embodiment

Figure 14:
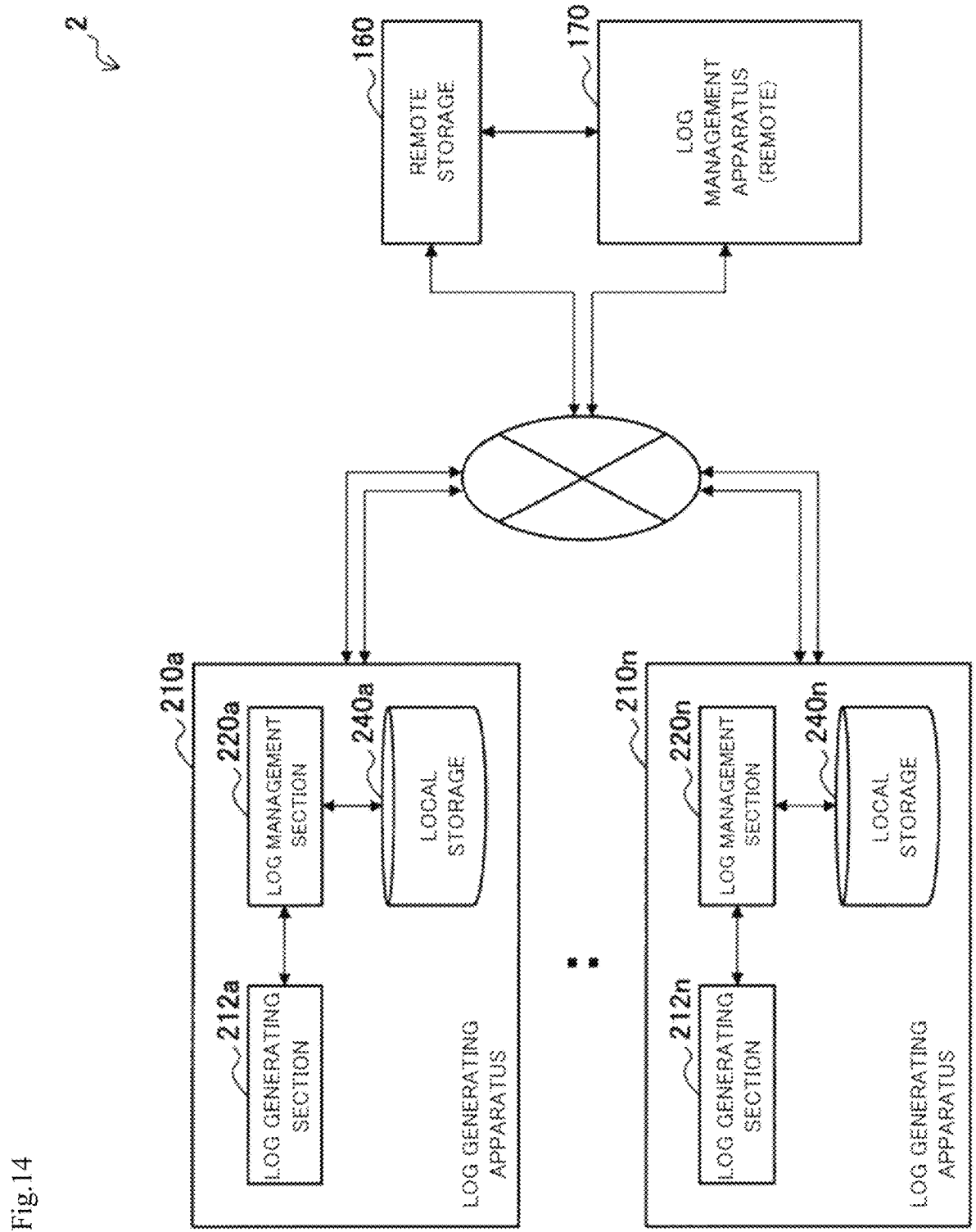
FIG. 14 is a block diagram illustrating an example of a configuration of a log management system according to a second embodiment.

FIG. 14 is a block diagram illustrating an example of a configuration of a log management system according to a second embodiment. With reference to FIG. 14, the log management system 2 includes a plurality of log generating apparatuses 210a, . . . , 210n, a remote storage 160, and a remote-side log management apparatus 170.

The log generating apparatuses 210a, . . . , 210n are apparatuses that generate log data for respective targets regularly or intermittently. The log generating apparatus 210a includes a log generating section 212a, a log management section 220a, and a local storage 240a. The log generating apparatus 210n includes a log generating section 212n, a log management section 220n, and a local storage 240n.

The log management section 220 (220a, . . . , 220n) splits the log data for the target generated by the log generating section 212 (212a, . . . , 212n) into a plurality of split log fragments per predetermined unit using secret splitting scheme. Then, the log management section 220 transmits a split log fragment for remote transmission to a remote environment to cause the remote storage 160 to store it, and causes the local storage 240 (240a, . . . , 240n) to store the remaining split log fragments. An example of a detailed configuration of each log generating apparatus 210 will further be described later.

The local storage 240 is a storage apparatus that stores remaining split log fragments in the log generating apparatus 210. The local storage 240 accumulates the remaining split log fragments for a plurality of process units.

As illustrated in FIG. 14, in the present embodiment, a plurality of (or a large number of) log generating apparatuses 210 are connected to the remote environment via respective specific communication channels. The configuration at the remote side may be similar to that of the first embodiment. The more apparatuses at the local side communicate directly with the remote environment, the more communication cost would be required for management of log data. However, according to the technology of the present disclosure, the individual log generating apparatus 210 transmits, in normal times, only a small amount of data to the remote environment. This means that the overall log management system 2 can benefit more greatly from reduction in communication cost by virtue of the technology of the present disclosure as the number of log generating apparatuses 210 is larger.

Figure 15:
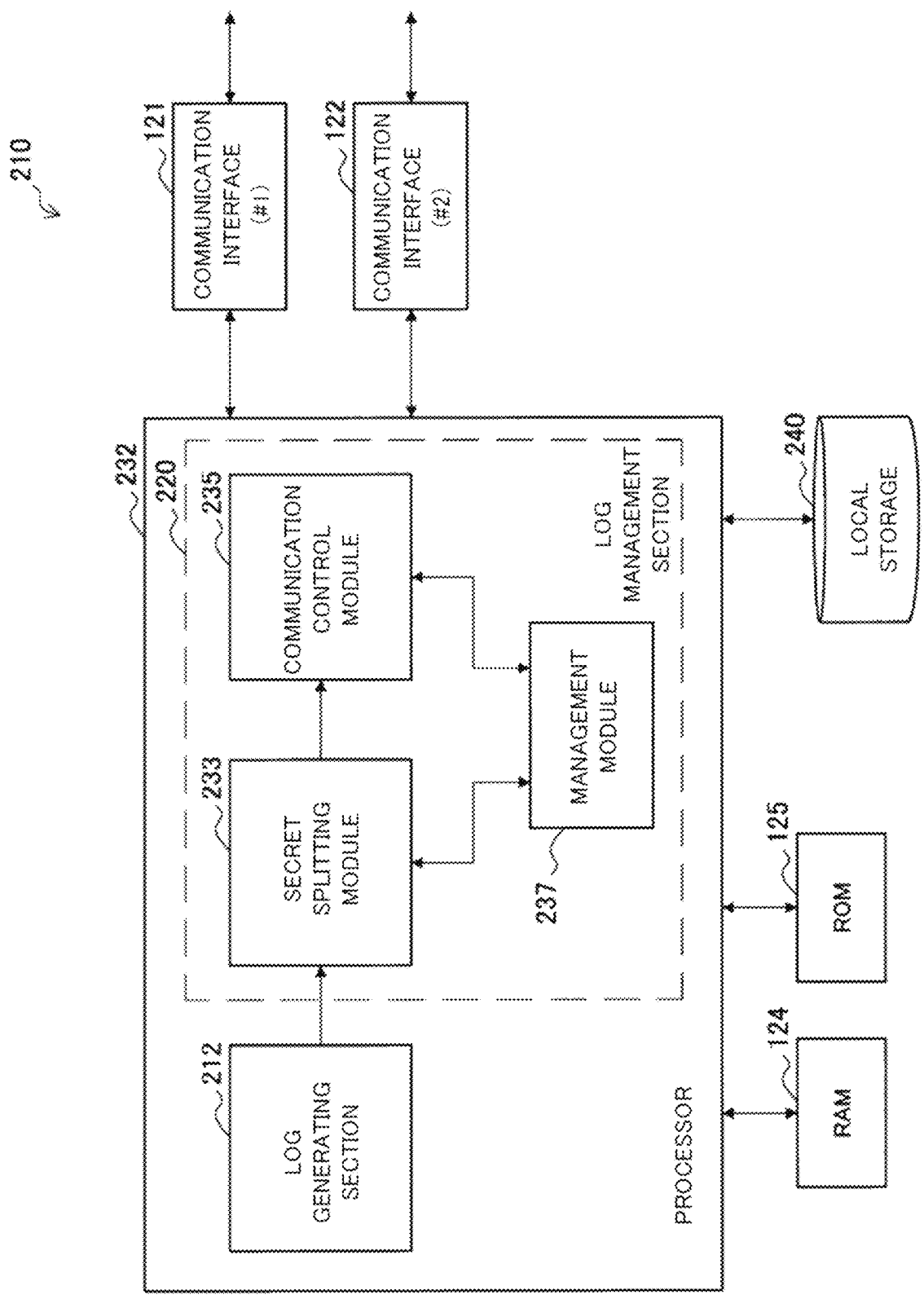
FIG. 15 is a block diagram illustrating an example of a detailed configuration of a local-side log management apparatus according to the second embodiment.

FIG. 15 is a block diagram illustrating an example of a detailed configuration of the local-side log management apparatus according to the present embodiment, that is, the log generating apparatus 210 illustrated in FIG. 14. With reference to FIG. 15, the log generating apparatus 210 includes a first communication interface 121, a second communication interface 122, a RAM 124, a ROM 125, a processor 232, and a local storage 240.

The processor 232 may be a CPU or an MPU, for example. The processor 232 causes some functional modules of the log generating apparatus 210 to operate by executing a computer program that has been stored by the ROM 125 in advance and is loaded into the RAM 124, for example. As illustrated in FIG. 15, the functional modules of the log generating apparatus 210 include the log generating section 212 and the log management section 220. The log management section 220 includes a secret splitting module 233, a communication control module 235, and the management module 237.

The secret splitting module 233 splits log data for a certain target generated by the log generating section 212 into a plurality of split log fragments per predetermined unit using the secret splitting scheme. The plurality of split log fragments include a split log fragment for remote transmission and remaining split log fragments, where the size of the split log fragment for remote transmission is smaller than the size of an individual remaining split log fragment or the total size of the remaining split log fragments. The secret splitting module 233 may split log data according to AONT scheme similarly to the first embodiment or may split log data according to threshold splitting scheme. The secret splitting processing may be performed per predetermined unit that is defined in advance so as to allow for extracting a necessary and sufficient range of remaining split log fragments for analyzing the log data.

The communication control module 235 transmits, in normal times, the split log fragments for remote transmission input from the secret splitting module 233 to the remote environment to cause the remote storage 160 to store the split log fragments for remote transmission. Upon occurrence of a log request event (for example, upon receiving a split log fragment transmission request from the remote-side log management apparatus 170), the communication control module 235 transmits one or more remaining split log fragments corresponding to log data to be partially recovered that are extracted from the local storage 240 to the remote-side log management apparatus 170.

Also in the present embodiment, the transmission of the split log fragments for remote transmission in normal times and the transmission of the remaining split log fragments in response to a log request may be performed over a communication channel to which a communication data volume-dependent charging system or a communication rate-dependent charging system is applied. Alternatively, the transmission of the split log fragments for remote transmission in normal times may be performed over the first communication channel and the transmission of the remaining split log fragments in response to a log request may be performed over the second communication channel having a higher communication rate than the first communication channel. The second communication interface 122 may be in a deactivated state in normal times, and may be temporarily activated in response to a log request.

The management module 237 manages the secret splitting processing performed by the secret splitting module 233 and the split log fragments transmission by the communication control module 235. For example, when log data that satisfies the predetermined unit has been generated by the log generating section 212, the management module 237 causes the secret splitting module 233 to perform the secret splitting processing on the log data. Then, the management module 237 causes the communication control module 235 to transmit a split log fragment for remote transmission to the remote environment and causes the local storage 240 to store the remaining split log fragments.

The management module 237 monitors occurrence of a log request event. For example, upon receiving a split log fragment transmission request from the remote-side log management apparatus 170, the management module 237 extracts, from the local storage 240, one or more remaining split log fragments in a range designated by the request and causes the communication control module 235 to transmit the one or more extracted remaining split log fragments to the remote-side log management apparatus 170.

Note that a flow of a process performed by the log generating apparatus 210 in the present embodiment may be similar to the flow of the process of the local-side log management apparatus 120 according to the first embodiment illustrated in FIG. 11.

Note that a flow of a process performed by the remote-side log management apparatus 170 in the present embodiment may be similar to the flow of the process illustrated in FIG. 13. At step S173 of FIG. 13, the remote-side log management apparatus 170 transmits a split log fragment transmission request to a specific log generating apparatus 210 that has generated log data which requires to be recovered, instead of transmitting the requests to all of the log generating apparatuses 210 that could be more than one. To which log generating apparatus 210 the request should be transmitted may be determined by the remote-side log management apparatus 170 based on an instruction from a user or automatically (for example, as a result of remote monitoring).

4. Conclusion

Embodiments of the technology according to the present disclosure have been described in detail using FIGS. 1 to 15 so far. In the above-described embodiments, log data that is generated regularly or intermittently for a certain target is split into a plurality of split log fragments including a split log fragment for remote transmission per predetermined unit using secret splitting scheme and the split log fragment for remote transmission is transmitted from a local side to a remote side to be stored by a remote apparatus. The split log fragment for remote transmission is a fragment with a smaller size than one or multiple remaining split log fragments. Then, in response to occurrence of an event that requires partial recovery of the log data, one or more remaining split log fragments corresponding to the log data to be partially recovered out of the remaining split log fragments accumulated by a local apparatus are transmitted from the local side to the remote side. At the remote side, the log data is partially recovered from the one or more received remaining split log fragments and the corresponding split log fragment for remote transmission using the secret splitting scheme. According to such a configuration, necessity to transmit entire log data or all of split fragments of the log data that tend to reach enormous data size to a remote environment is avoided. Therefore, it becomes possible to manage log data more efficiently than the existing techniques while keeping robust security based on the secret splitting scheme.

In the above-described embodiments, in response to the occurrence of the event, a request that designates one or more remaining split log fragments corresponding to the log data to be partially recovered is transmitted from the remote side to the local side and the one or more remaining split log fragments are received at the remote side as a response to the request. According to such a configuration, only a necessary and sufficient range of remaining split log fragments can be obtained at the remote side depending on an intended use of the log data (for example, investigation into cause of a trouble that has occurred in a target of the log or analysis for improving operation of or environment around the target of the log). Since inspecting or analyzing log data in most intended uses is, in general, carried out on needed portions of log data at needed timings, the above-described mechanism can reduce cost required for managing log data without impairing availability of log data.

In an embodiment example, the split log fragment for remote transmission is transmitted regularly or intermittently from the local side to the remote side over a first communication channel and the remaining split log fragments are transmitted from the local side to the remote side over a second communication channel having a higher communication rate than the first communication channel in response to the occurrence of the event. In this case, the small-sized split log fragment for remote transmission can be transferred over the first communication channel with a low communication cost in normal times, which allows for preventing mere accumulation of log data that might not be fully utilized from causing a huge communication cost.

In another embodiment example, the split log fragment for remote transmission is transmitted regularly or intermittently from the local side to the remote side over a first communication channel and the remaining split log fragments are transmitted from the local side to the remote side over the first communication channel in response to occurrence of the event. The first communication channel is a communication channel to which a communication data volume-dependent charging system or a communication rate-dependent charging system is applied. In this case, as a result that the overall amount of data of split log fragments to be transferred is reduced by the above-described mechanism, the communication cost required for managing the log data is reduced.

In an embodiment, the log management system may include a plurality of log generating apparatuses, each of which includes a secret splitting module configured to perform secret splitting processing in a local environment and a communication control module configured to transmit the split log fragment for remote transmission. Though increase in the number of log generating apparatuses that directly communicate with a remote environment leads to a higher communication cost required for managing log data in the overall system, the individual log generating apparatus transmits, in normal times, only a small amount of data to the remote environment. As such, it will be possible to efficiently manage log data as a whole in the system without requiring an excessive communication cost. For example, in a system that manages log data generated by many apparatuses without any fixed communication line, each apparatus may transmit the split log fragment for remote transmission over a communication channel of LPWA scheme. Since the split log fragment for remote transmission is compressed to a small size (for example, to a few bytes or tens of bytes) as a result of the secret splitting processing irrespective of the large size of the log data, the split log fragment for remote transmission can be transferred smoothly over the communication channel of the LPWA scheme. Each apparatus may activate, in response to the occurrence of the event, a second communication channel of a non-LPWA scheme having a higher communication rate and transmit one or more remaining split log fragments over the second communication channel By temporarily activating the second communication channel of the non-LPWA scheme in this way, it will be possible to quickly collect the larger-sized remaining split log fragments from the log generating apparatuses. Consequently, the log data can also be timely utilized.

For example, the remote apparatus that accumulates the split log fragments for remote transmission may be a storage apparatus to which a storage data volume-dependent charging system is applied. As not only the communication data amount but also the data amount of split log fragments to be stored in the remote apparatus is reduced by the above-mentioned mechanisms, the cost required for log data management in such a case will be more greatly reduced.

In addition, in the above-described embodiment, the log data may be split and recovered according to the AONT scheme. With the AONT scheme, the total data size will not substantially change through the splitting. Moreover, according to the AONT scheme, the original data will be irrecoverable when even one small split fragment (for example, the split log fragment for remote transmission) is lost. Therefore, utilizing the AONT scheme is suitable for the above-described mechanisms that are to maintain robust security against information leakage in an environment with constraints on available communication resources and storage resources.

The preferred embodiments of the present disclosure have been described in detail above with reference to the accompanying drawings, however, the technical scope of the present disclosure is not limited to the above examples. It is apparent that a person having ordinary skill in the art of the present disclosure may conceive various alterations or modifications within the scope of technical spirit described in the claims, and it will be appreciated that they will naturally come under the technical scope of the present disclosure.

The computer programs described in the present Specification are stored in a non-transitory computer-readable medium provided inside or outside an apparatus. Each of those programs is, for example, loaded into a RAM for execution and executed by a processor. The computer-readable medium may be any type of medium such as a ROM, a compact disc (CD), a digital versatile disc (DVD), an HDD, an SSD, a magneto-optical disk, a magnetic disk, a magnetic tape, a cassette tape, a semiconductor memory, or a combination thereof, for example.

REFERENCE SIGNS LIST 1, 2 Log Management System
100 Local Environment
110 Log Generating Apparatus
120 Local-side Log Management Apparatus
133 Local-side Secret Splitting Module
135 Local-side Communication Control Module
140 Local Storage
150 Remote Environment
160 Remote Storage
170 Remote-side Log Management Apparatus
183 Remote-side Communication Control Module
185 Remote-side Secret Splitting Module
210 Log Generating Apparatus/Local-Side Log Management Apparatus
212 Log Generating Section
220 Log Management Section
233 Local-side Secret Splitting Module
235 Local-side Communication Control Module
240 Local Storage

The invention claimed is:

1. A log management system for managing log data for a target, comprising:
a local computer configured to
split the log data that is generated regularly or intermittently for the target into a plurality of split log fragments including a split log fragment for remote transmission per predetermined unit according to All Or Nothing Transform (AONT) scheme, the split log fragment for remote transmission having a smaller size than remaining split log fragments, and
regularly or intermittently transmit the split log fragment for remote transmission to a remote apparatus over a first communication channel to cause the remote apparatus to store the split log fragment for remote transmission; and
a remote computer configured to
receive, in response to occurrence of an event that requires partial recovery of the log data, one or more remaining split log fragments over a second communication channel having higher communication rate than the first communication channel, the one or more remaining split log fragments corresponding to the log data to be partially recovered out of the remaining split log fragments accumulated by a local apparatus, and
recover the log data from the one or more received remaining split log fragments and the corresponding split log fragment for remote transmission according to the AONT scheme.

2. The log management system according to claim 1, wherein the remote computer is configured to transmit a request that designates the one or more remaining split log fragments corresponding to the log data to be partially recovered in response to occurrence of the event and receive the one or more remaining split log fragments as a response to the request.

3. The log management system according to claim 1, wherein
the local computer is configured to regularly or intermittently transmit the split log fragment for remote transmission to the remote apparatus over the first communication channel,
the remote computer is configured to receive the one or more remaining split log fragments over the first communication channel in response to occurrence of the event, and
the first communication channel is a communication channel to which a communication data volume-dependent charging system or a communication rate-dependent charging system is applied.

4. The log management system according to claim 1, including a plurality of log generating apparatuses, each of which comprises the local computer.

5. The log management system according to claim 4, wherein the local computer is configured to transmit the split log fragment for remote transmission to the remote apparatus over the first communication channel of Low Power Wide Area (LPWA) scheme.

6. The log management system according to claim 5, wherein the local computer is configured to transmit the one or more remaining split log fragments over the second communication channel of non-LPWA scheme having higher communication rate than the LPWA scheme in response to occurrence of the event.

7. The log management system according to claim 1, wherein the event includes detection of a trouble of the target.

8. The log management system according to claim 1, wherein the event includes an instruction of partial recovery of the log data from a user.

9. The log management system according to claim 1, wherein the remote apparatus is a storage apparatus to which storage data volume-dependent charging system is applied.

10. A log management apparatus for managing log data for a target, comprising:
a local computer configured to
split the log data that is generated regularly or intermittently for the target into a plurality of split log fragments including a split log fragment for remote transmission per predetermined unit according to All Or Nothing Transform (AONT) scheme, the split log fragment for remote transmission having a smaller size than remaining split log fragments, and
regularly or intermittently transmit the split log fragment for remote transmission to a remote apparatus over a first communication channel to cause the remote apparatus to store the split log fragment for remote transmission, and transmit, in response to occurrence of an event that requires partial recovery of the log data, one or more remaining split log fragments over a second communication channel having higher communication rate than the first communication channel, the one or more remaining split log fragments corresponding to the log data to be partially recovered out of the remaining split log fragments accumulated by the local computer to the remote computer which is to recover the log data from the one or more remaining split log fragments and the corresponding split log fragment for remote transmission according to the AONT scheme.

11. A method performed in a log management apparatus for managing log data for a target, comprising:
splitting the log data that is generated regularly or intermittently for the target into a plurality of split log fragments including a split log fragment for remote transmission per predetermined unit according to All Or Nothing Transform (AONT) scheme, the split log fragment for remote transmission having a smaller size than remaining split log fragments;
regularly or intermittently transmitting the split log fragment for remote transmission to a remote apparatus over a first communication channel to cause the remote apparatus to store the split log fragment for remote transmission; and
transmitting, in response to occurrence of an event that requires partial recovery of the log data, one or more remaining split log fragments over a second communication channel having higher communication rate than the first communication channel, the one or more remaining split log fragments corresponding to the log data to be partially recovered out of the remaining split log fragments accumulated by a local computer to a remote computer which is to recover the log data from the one or more remaining split log fragments and the corresponding split log fragment for remote transmission according to the AONT scheme.

12. A non-transitory computer-readable medium which, when read by a processor of a log management apparatus for managing log data for a target, causes the processor to function as:
a local computer configured to
split the log data that is generated regularly or intermittently for the target into a plurality of split log fragments including a split log fragment for remote transmission per predetermined unit according to All Or Nothing Transform (AONT) scheme, the split log fragment for remote transmission having a smaller size than remaining split log fragments,
regularly or intermittently transmit the split log fragment for remote transmission over a first communication channel to a remote apparatus to cause the remote apparatus to store the split log fragment for remote transmission, and
transmit, in response to occurrence of an event that requires partial recovery of the log data, one or more remaining split log fragments over a second communication channel having higher communication rate than the first communication channel, the one or more remaining split log fragments corresponding to the log data to be partially recovered out of the remaining split log fragments accumulated by a local apparatus to a remote computer which is to recover the log data from the one or more remaining split log fragments and the corresponding split log fragment for remote transmission according to the AONT scheme.

* * * * *